United States Patent
Samuell et al.

(10) Patent No.: US 9,438,494 B2
(45) Date of Patent: Sep. 6, 2016

(54) APPARATUS AND METHODS FOR OPTIMIZING NETWORK DATA TRANSMISSION

(71) Applicant: AVVASI INC., Waterloo (CA)

(72) Inventors: Charles Neville Samuell, Toronto (CA); Richard Ryan Larocque, Seattle, WA (US); Kevin Goertz, Waterloo (CA)

(*) Notice: Subject to any disclaimer, the term of this patent is extended or adjusted under 35 U.S.C. 154(b) by 91 days.

(21) Appl. No.: 13/724,523

(22) Filed: Dec. 21, 2012

(65) Prior Publication Data

US 2014/0012981 A1 Jan. 9, 2014

Related U.S. Application Data

(60) Provisional application No. 61/580,782, filed on Dec. 28, 2011.

(51) Int. Cl.
*G06F 15/173* (2006.01)
*H04L 12/26* (2006.01)
*H04L 12/893* (2013.01)
*H04L 12/801* (2013.01)

(52) U.S. Cl.
CPC ......... *H04L 43/0811* (2013.01); *H04L 47/193* (2013.01); *H04L 47/40* (2013.01)

(58) Field of Classification Search
CPC ... H04L 43/0811; H04L 67/10; H04L 63/08; H04L 45/74; H04L 29/08
USPC ................ 709/224, 203, 223, 217, 218, 219
See application file for complete search history.

(56) References Cited

U.S. PATENT DOCUMENTS 7,274,740 B2 * 9/2007 van Beek et al. ....... 375/240.02
8,355,405 B2 * 1/2013 Somech et al. ............... 370/400
(Continued)

FOREIGN PATENT DOCUMENTS

WO   2009/015461 A1   2/2009
WO   2009015461      2/2009

OTHER PUBLICATIONS

International Search Report and Written Opinion dated Jan. 28, 2013, International Application No. PCT/CA2012/000906.
(Continued)

*Primary Examiner* — Liangche A Wang
*Assistant Examiner* — Kaylee Huang
(74) *Attorney, Agent, or Firm* — Bereskin & Parr LLP/S.E.N.C.R.L.,s.r.l.

(57) ABSTRACT

Apparatus and methods for optimizing data transmission between two hosts via a network device. The network device initially allows a first connection to be established between the two host devices. This first connection is logically established directly between the host devices without modification by the network device. The network device analyzes data transmitted via the first connection and determines whether to allow the first connection to continue without intervention by the network device, or whether to split the connection into separate TCP connections with the network device as intermediary. The network device maintains connection state and emulates both host devices to allow the first connection to be split without disrupting the communication at either host device.

18 Claims, 12 Drawing Sheets

(56) References Cited

U.S. PATENT DOCUMENTS

| | | |
|---|---|---|
| 2001/0009548 A1 | 7/2001 | Morris |
| 2003/0014684 A1* | 1/2003 | Kashyap ........................ 714/4 |
| 2008/0155087 A1 | 6/2008 | Blouin et al. |
| 2008/0195761 A1* | 8/2008 | Jabri et al. .................. 709/250 |
| 2008/0295169 A1* | 11/2008 | Crume ......................... 726/22 |
| 2009/0129399 A1* | 5/2009 | Malysh et al. ............... 370/410 |
| 2009/0285225 A1 | 11/2009 | Dahod |
| 2011/0228859 A1 | 9/2011 | Sugimoto et al. |
| 2012/0117225 A1 | 5/2012 | Kordasiewicz et al. |

OTHER PUBLICATIONS

Co-pending U.S. Appl. No. 13/631,366 entitled, "Systems and Methods for Media Service Delivery", filed Sep. 28, 2012 (Retrievable from PAIR).
International Preliminary Report on Patentability dated Apr. 10, 2014, International Application No. PCT/CA2012/000906.
Extended European Search Report dated May 11, 2015, European Patent Application No. 12835805.8.

* cited by examiner

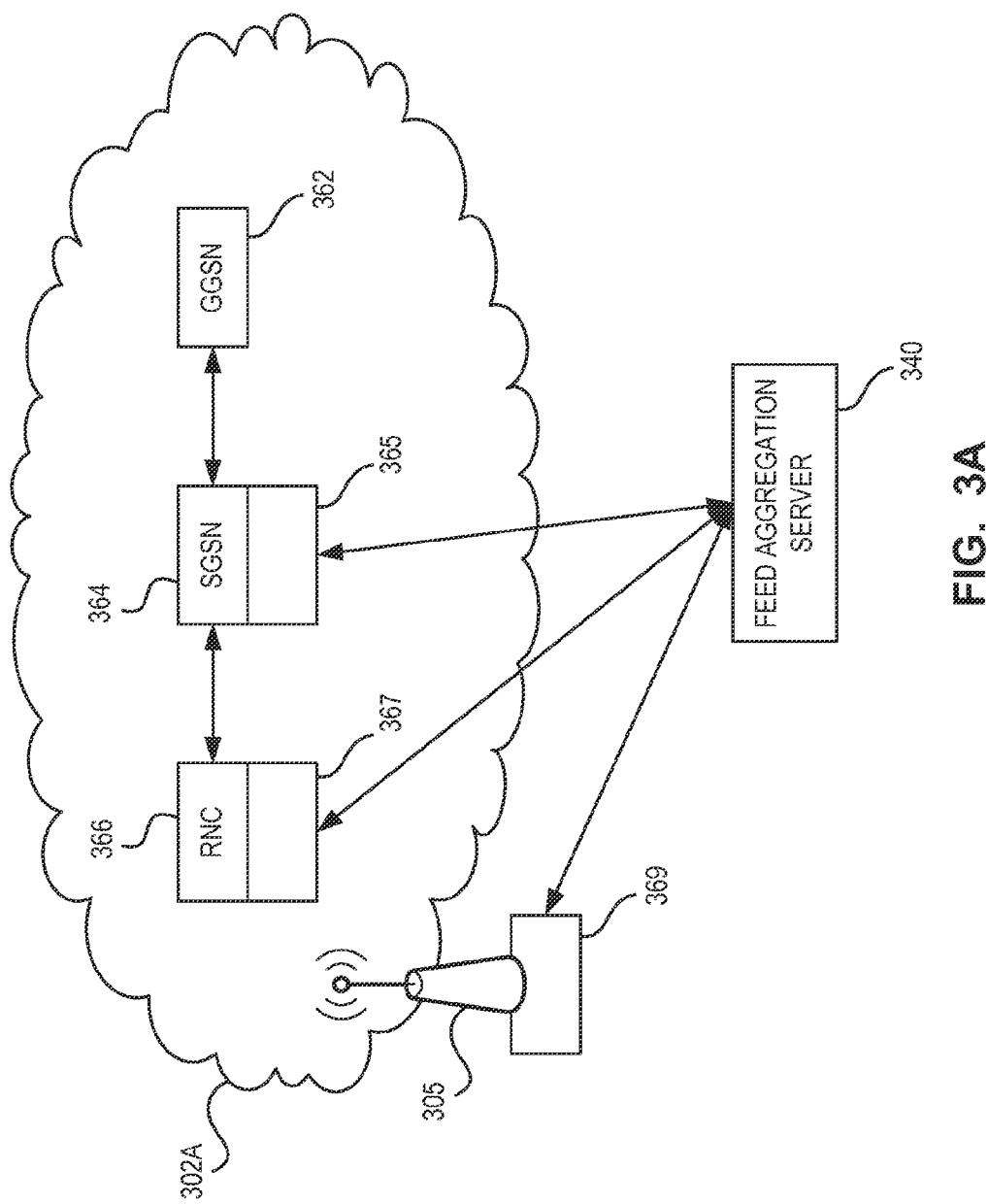

APPARATUS AND METHODS FOR OPTIMIZING NETWORK DATA TRANSMISSION

CROSS-REFERENCE TO RELATED APPLICATION

This application claims the benefit of U.S. Provisional Patent Application No. 61/580,782, entitled "Intelligent TCP Proxy", filed Dec. 28, 2011. The entire contents of U.S. Provisional Patent Application No. 61/580,782 are hereby incorporated by reference.

FIELD

The described embodiments relate to the delivery of data traffic in a computer network and, in particular, to the delivery of data traffic in a mobile network.

BACKGROUND

The Transmission Control Protocol (TCP) provides the backbone of the modern Internet. TCP is used to provide ordered delivery of data between two hosts using a stateful connection. TCP assures that one host can send a bytestream (e.g., file, message, etc.) over an unreliable communication medium (unreliable in the sense that delivery is not guaranteed) as a series of individual packets, and that the remote host will be able to reconstruct the bytestream in the correct order and with all the data intact. To achieve this reliability, both hosts participate in the delivery; the sender provides a "sequence number" in each packet it transmits, which increases as each packet is transmitted. The sequence number is increased by an amount corresponding to the number of bytes in the payload of each packet. This approach allows packets to be reassembled correctly, even if they are received out of order.

The recipient is responsible for acknowledging each byte of data it receives using a cumulative acknowledgement scheme. Specifically, the recipient transmits an "acknowledgement number" to the sender specifying the number of the next byte expected to be received. This also signifies to the sender that the recipient has received all transmitted bytes up to that indicated by the acknowledgment number. For example, if a sender sends a packet containing four payload bytes with a sequence number field of 10000, then the sequence numbers of the four payload bytes are 10000, 10001, 10002 and 10003. When this packet is successfully received, the recipient would send back an acknowledgment number of 10004, since 10004 is the sequence number of the next byte it expects to receive in the next packet.

By monitoring the acknowledgements coming back from the recipient, the sender can determine when one or more packets have been lost in transit and need to be retransmitted. On top of this straightforward reliability mechanism, TCP also implements several other important features such as flow control and congestion avoidance.

The reliable transmission features of TCP limit its flexibility. Since every packet of data is accounted for using acknowledgements, an intermediate network device is unable to modify the bytestream by changing individual packets; any addition or removal of data disrupts the sequence number of the bytes received by the recipient, and causes a change in the acknowledgement numbers sent by the recipient. These changed acknowledgements no longer correspond directly to the bytes of data the sender expects to receive, leading to instability, unnecessary retransmissions, degradation of network throughput as congestion controls are enacted, and in some cases a complete breakdown of the connection.

Therefore, if an intermediate network device is to modify the data exchanged between two hosts, the intermediate device generally divides the connection into two separate TCP connections and coordinates data transmission between the two hosts. This practice is known as "proxying" a connection, and the intermediate device is known as a "TCP proxy".

Many modern web technologies employ a TCP proxy. A classic example of a TCP proxy is a Hypertext Transfer Protocol (HTTP) gateway, which is positioned between a web browser client and web server to improve performance by caching content, modifying requests to use more efficient delivery mechanisms, and the like. The gateway does not allow a direct connection to be established between the client and server, instead the gateway establishes two separate connections and acts as a TCP proxy.

Conventional HTTP gateways are generally "transparent" (sometimes called "forced" or "intercepting"), meaning that every connection attempted through the gateway will be intercepted and split into two connections, but that the client and server need not be aware of the proxy. On busy networks, proxying a large plurality of TCP connections is very resource intensive, making proper provisioning difficult.

SUMMARY

In a broad aspect, some embodiments of the invention provide a method of optimizing data transmission for a current data flow from a first host to a second host via a network device, the method comprising: allowing establishment of a first connection between the first host and the second host for the current data flow; monitoring the current data flow at the network device; determining whether to use an active connection state for the current data flow; and when the active connection state is to be used: intercepting the current data flow in the first connection at the network device; establishing a second connection between the first host and the network device; establishing a third connection between the second host and the network device; and continuing the current data flow using the second and third connections.

When the active connection state is not to be used, the method may further comprise remaining in a passive connection state for the current data flow, wherein in the passive connection state the current data flow continues using the first connection.

While determining whether to use the active connection state, the method may further comprise deferring transmission of the at least one data packet to the second host during at least one decision window.

The monitoring may comprise maintaining a connection state for the current data flow, and the network device may emulate the second host in the second connection based on the connection state, and the network device may emulate the first host in the third connection based on the connection state.

The method may further comprise timing each of the at least one decision window; and entering the active connection state for the current data flow when a length of the determining for one of the at least one decision window exceeds a predetermined identification period.

The determining may be based on a control signal that indicates the active connection state is to be used.

The method may further comprise analyzing at least one data packet in the current data flow, wherein the determining is based on the analysis of the at least one data packet.

The at least one data packet may comprise a plurality of packets, and the analyzing may comprise assembling the plurality of packets to provide payload data for the analyzing.

When in the active connection state, the method may further comprise determining that the current flow data is to be modified.

The current flow data may comprise video data, and the modifying may comprise transcoding the video data.

In another broad aspect, there is provided a network device for optimizing data transmission for a current data flow from a first host to a second host, the device comprising: a memory; at least one communication interface; at least one processor, the at least one processor configured to: allow establishment of a first connection between the first host and the second host for the current data flow; monitor the current data flow at the network device; determine whether to use an active connection state for the current data flow; and when the active connection state is to be used: intercept the current data flow in the first connection at the network device; establish a second connection between the first host and the network device; establish a third connection between the second host and the network device; and continue the current data flow using the second and third connections.

The at least one processor may be further configured, when the active connection state is not to be used, to remain in a passive connection state for the current data flow, wherein in the passive connection state the current data flow continues using the first connection.

The at least one processor may be further configured, while determining whether to use the active connection state, to defer transmission of the at least one data packet to the second host during at least one decision window.

The at least one processor may be further configured to maintain a connection state for the current data flow; and, when the active connection state is used, to: emulate the second host in the second connection based on the connection state; and emulate the first host in the third connection based on the connection state.

The at least one processor may be further configured to: time each of the at least one decision window; and enter the active connection state for the current data flow when a length of the determining for one of the at least one decision window exceeds a predetermined identification period.

The at least one processor may determine whether to use the active connection state based on a control signal that indicates the active connection state is to be used.

The at least one processor may be further configured to analyze at least one data packet in the current data flow, and determine whether to use the active connection state based on the analysis of the at least one data packet.

The at least one data packet may comprise a plurality of packets, and the at least one processor may assemble the plurality of packets to provide payload data for the analyzing.

When in the active connection state, the at least one processor may be further configured to determine that the current flow data is to be modified.

The current flow data may comprise video data, and the at least one processor may be configured to transcode the video data.

BRIEF DESCRIPTION OF THE DRAWINGS

Preferred embodiments of the present invention will now be described in detail with reference to the drawings, in which:

FIG. 3A is an example implementation of a mobile data network in accordance with the system of FIG. 2;

Figure 1A:
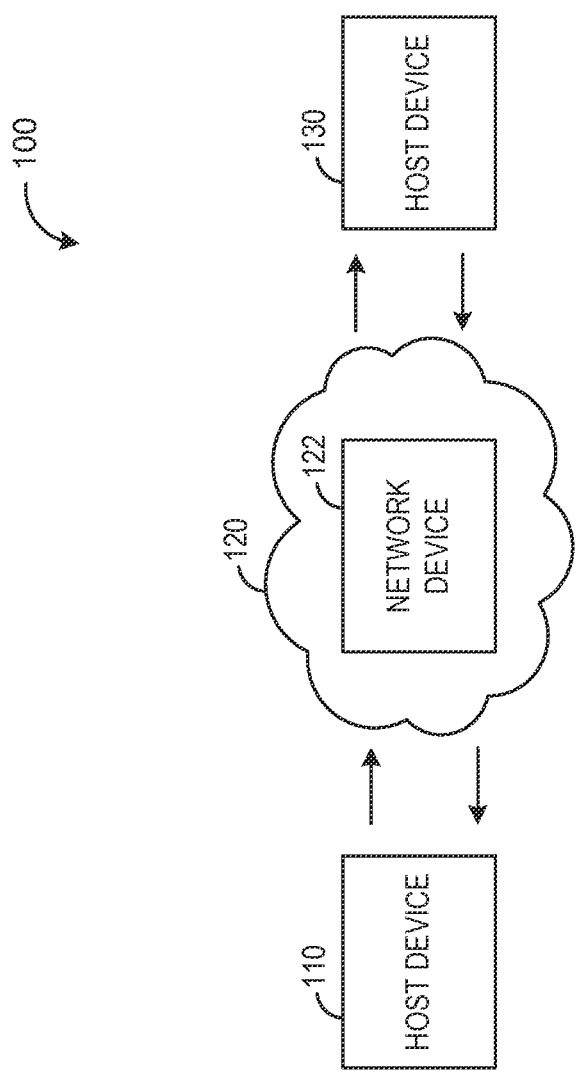
FIG. 1A is a simplified block diagram of an example TCP system.

The drawings, described below, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. Further, where considered appropriate, reference numerals may be repeated among the figures to indicate corresponding or analogous elements.

DESCRIPTION OF EXEMPLARY
EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, tablet computer or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g. flash memory, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

As described above, proxying a large plurality of TCP connections can be very resource intensive on busy networks, making proper provisioning difficult. Nevertheless, in many cases, even if a conventional HTTP gateway is only able to serve 10% of web requests from a local cache (obviating the need to using more expensive external network resources), it may still be worth the cost of proxying 100% of the connections.

However, if the gateway was able to selectively proxy only the 10% of connections that it is capable of servicing from cache, and to allow the remaining 90% of connections to pass through unmodified, the gateway in theory could be used to handle ten times more traffic than a conventional HTTP gateway. This would greatly reduce the cost of proxying while maintaining the benefit. Unfortunately, this is not possible with conventional TCP proxies, due to a Catch-22 type situation. Specifically, the proxy needs payload data transmitted after TCP connection establishment to determine if it should service the request, but it can only act as proxy if it intervenes immediately at connection establishment (i.e., before payload data is transmitted).

The described embodiments generally provide systems and methods capable of passively monitoring a large number of TCP connections and actively proxying selected connections after the TCP connection is established, if desired.

The embodiments described herein may be used in conjunction with systems and methods for providing congestion estimation in a communications network, which can be found, for example, in co-pending U.S. application Ser. No. 13/053,565, the entire contents of which are hereby incorporated by reference. The embodiments described herein may also be used in conjunction with systems and methods for managing multimedia traffic in wired and wireless communication networks, which can be found, for example, in co-pending U.S. application Ser. No. 13/631,366, the entire contents of which are hereby incorporated by reference.

Reference is first made to FIG. 1A illustrating a block diagram of a TCP system 100. System 100 generally comprises a first host 110 and a second host 130 engaged in data communication. System 100 also comprises a network 120 coupled between the first host 110 and the second host 130.

In the illustrated embodiments, the first host 110 and second host 130 each may be any computing device, comprising a processor and memory, and capable of communication via a mobile data network. For example, the first host 110 or second host 130 may be a personal computer, workstation, server, tablet computer, mobile computing device, personal digital assistant, laptop, smart phone, video display terminal, gaming console, electronic reading device, portable electronic device, or a combination of these. The first host 110 is generally operable to send or transmit requests, such as, for example, requests for media content. The second host 130 is generally operable to receive request and to transmit content in response to the requests.

In various embodiments, the first host 110 comprises a client which may be an application, such as a computing application, application plug-in, a widget, mobile device application, Java™ application, or web browser executed by the device 110 in order to send or transmit data.

The second host 130 may comprise one or more media servers for providing access to multimedia content, such as video and audio content. Second host 130 may be operable to initiate and maintain one or more streaming sessions. The content may comprise a wide variety of user-generated content, including movies, movie clips, TV shows, TV clips, music videos, video blogging and short original videos, etc. Examples of the second host 130 include websites such as YouTube™ and Netflix™, etc. Second host 130 may also store a plurality of versions of the same multimedia content, such as, for example, different formats or resolutions of the same multimedia content. For example, a media server may store the same movie clip in two or more video resolutions, such as 480p, 720p, 1080i or 1080p. Likewise, the media server may store the same movie clip in two or more video formats, such as Windows Media Video or Moving Picture Experts Group MPEG-4 Advanced Video Coding (MPEG-4 AVC).

Network 120 may comprise one or more data communication networks capable of carrying data between the first host 110 and the second host 130. Data networks may include the Internet, public switched telephone network (PSTN), or any other suitable local area network (LAN) or wide area network (WAN), mobile data networks (e.g., Universal Mobile Telecommunications System (UMTS), 3GPP Long-Term Evolution Advanced (LTE Advanced), Worldwide Interoperability for Microwave Access (Wi-MAX), etc.) and combinations thereof.

Network 120 may comprise one or more server, router or network device 122 equipped with a processor and memory storing, for example, a database or file system. Although only one network device 122 is shown for clarity, there may be multiple network devices 122 distributed over a wide geographic area and connected via, for example, network 120.

Typically, a TCP connection is established between the first host 110 and the second host 130 using a three-way handshake. The second host 130 listens on a port, and opens the port for connections. Once the connection is opened initially, the first host 110 may send a synchronize message ("SYN") to the second host 130. In response, the second host 130 may reply with an acknowledgement to the synchronize message ("SYN-ACK"). Finally, the first host 110 sends an acknowledgment message ("ACK") back to the second host 120 establishing the TCP connection.

Once the TCP connection is established, the second host 130 is operable to commence a media streaming session in response to a request for multimedia content from the first host 110, as described further herein. The request may traverse a mobile data network, such as network 120, and be relayed via the network device 122. Network device 122 may deny the request, modify it, or transmit it further to the second host 130, which connects to a suitable network for delivering the request.

Figure 1B:
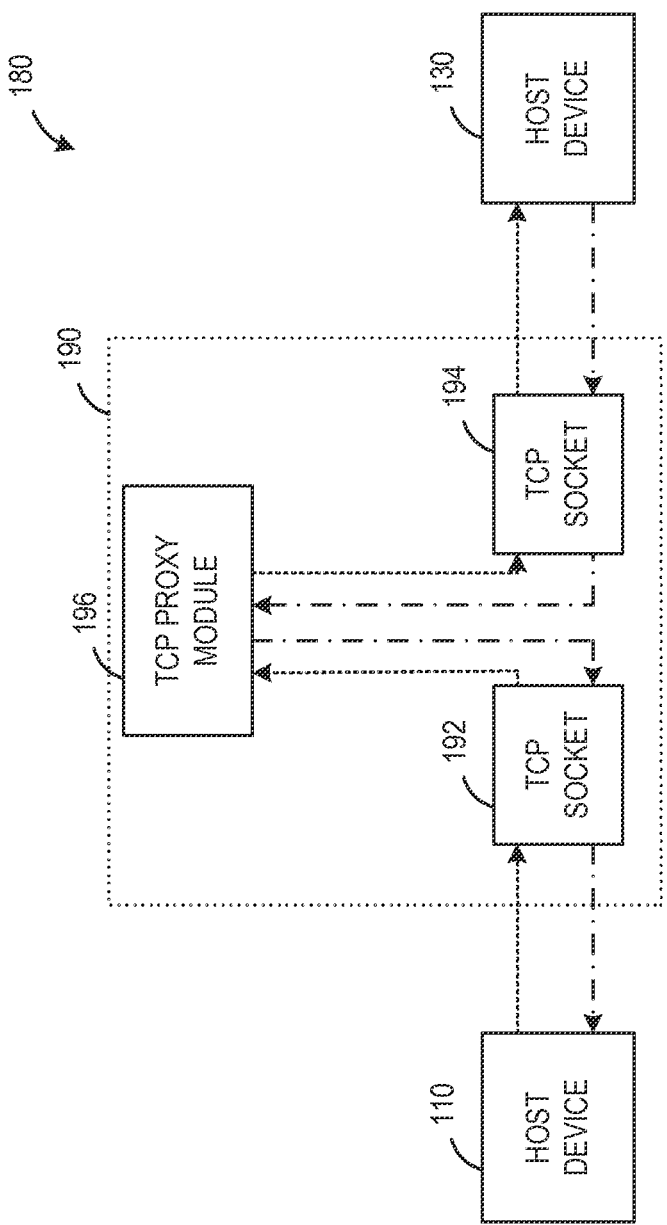
FIG. 1B is a block diagram of a prior art TCP system.

Referring now to FIG. 1B, there is illustrated a block diagram of a prior art TCP system. TCP system 180 includes host device 110, host device 130 and a proxy device 190.

Proxy device 190 is an intermediate network computing device, located inline on the path between two host devices 110 and 130, which manages two independent TCP connections, allowing proxy device 190 to analyze, copy, and modify the data transmitted between the two hosts. Generally, TCP proxy module 196 is a software application that opens TCP sockets 192 and 194 in response to intercepting a connection request from one of host device 110 or 130. TCP proxy module 196 then reads from each socket and writes to the other, possibly modifying the data (bytestream) if appropriate.

Data from host device 110 is delivered to TCP socket 192 using standard TCP communication. TCP proxy module 196 then reads the data received by TCP socket 192 and copies or modifies the data as appropriate before writing the modified data to TCP socket 194, which then sends it to host device 130.

TCP connections can generally be broken down into three phases: connection establishment, data transfer, and connection teardown. The behavior of a conventional TCP proxy in each of these phases is described with reference to FIG. 10.

Figure 1C:
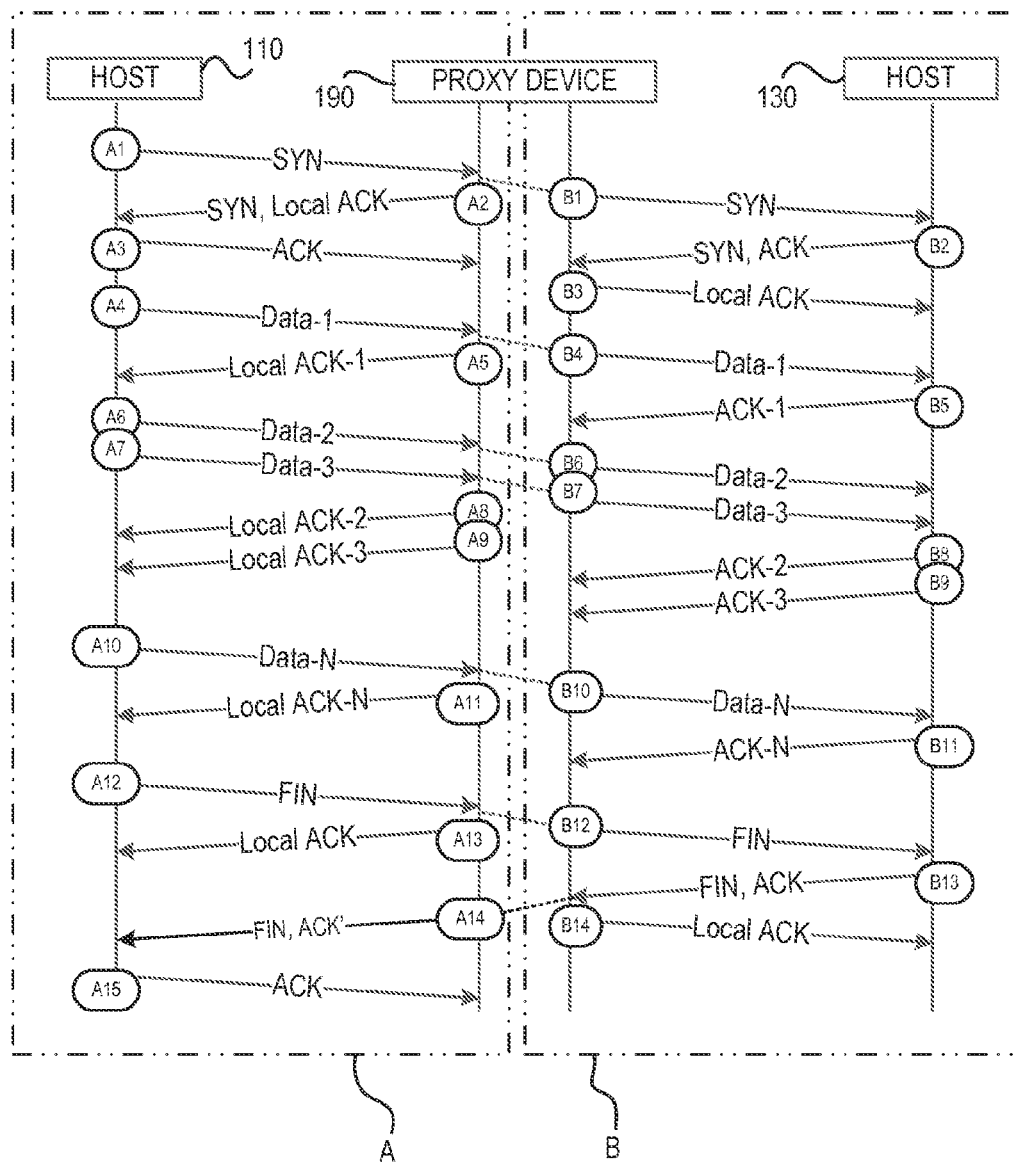
FIG. 1C is a data flow diagram for a conventional TCP proxy, such as the system of FIG. 1B.

Referring now to FIG. 1C, there is illustrated a data flow diagram for a conventional TCP proxy, such as proxy device 190.

Connection establishment begins at A1 as proxy device 190 intercepts a connection establishment request (SYN packet) from host device 110 originally destined for host device 130.

Proxy device 190 receives the SYN packet from host device 110 and initiates a connection establishment for a connection B between proxy device 190 and host device 130, by sending a second SYN packet at B1.

Proxy device 190 transmits a SYN ACK acknowledgment packet to host device 110 at A2.

At B2, host device 130 also transmits a SYN ACK acknowledgment packet to proxy device 190 in response to the second SYN packet, thus establishing the second connection.

Some TCP proxies may wait for a response from host device 130 before responding to host device 110, or in some cases wait to receive data from host device 110 before initiating a connection with host device 130.

Host device 110 transmits an ACK at A3, establishing connection A. Similarly, proxy device 190 transmits an ACK at B3, establishing connection B.

Once both connections are established, data can be transferred between the host devices 110 and 130 via the proxy device 190, and the devices enter the data transfer phase.

In the data transfer phase, which begins at A4, host device 110 sends data packets which are received by proxy device 190 (e.g., at TCP socket 192). Whenever a data packet is received, the proxy device 190 sends an acknowledgement packet (ACK) to the host device 110, and then delivers the data to the TCP proxy module 196. The TCP proxy module 196 then performs any processing, if needed, and writes the data to the TCP socket 194 to be sent to the host device 130. The same process is carried out in reverse for communications originating from host device 130 to host device 110. Since each connection is technically independent, ACKs will always be received and generated locally.

As seen in FIG. 1C, data packets are transmitted from host device 110 to proxy device 190 at A6, A7 and A10. Proxy device 190 forwards the data at B6, B7 and B10, and transmits ACK packets at A8, A9 and A11.

Upon completion of the data transfer phase, connection teardown can be initiated by host device 110 by a teardown packet (e.g., a RN or RST packet) to proxy device 190 at A12. TCP socket 192 of proxy device 190 acknowledges the teardown request locally at A13 and forwards the teardown request to TCP proxy module 196. TCP proxy module 196 will generally initiate teardown of the connection with host device 130 by sending a dose command to TCP socket 194, which transmits a RN packet to host device 130 at B12. Host device 130 acknowledges the teardown request by transmitting a FIN, ACK packet at B13. A corresponding FIN, ACK' packet is forwarded by proxy device 190 to host device 110 at A14. Receipt of the RN, ACK and RN, ACK' packets is acknowledged at B14 and A15, respectively.

Occasionally, a TCP proxy module 196 may keep one connection active longer than the other, for example, in anticipation of re-using the connection in the future.

Generally, proxy device 190 participates in connection establishment, data transfer, and connection teardown according to packets received from host device 110 and 130. Each connection (A and B) is managed independently using local ACKs, and data is copied back and forth via the TCP proxy module 196. Connections A and B are fully independent of each other. That is, host devices 110 and 130 do not directly exchange unmodified packets with each other.

Figure 2:
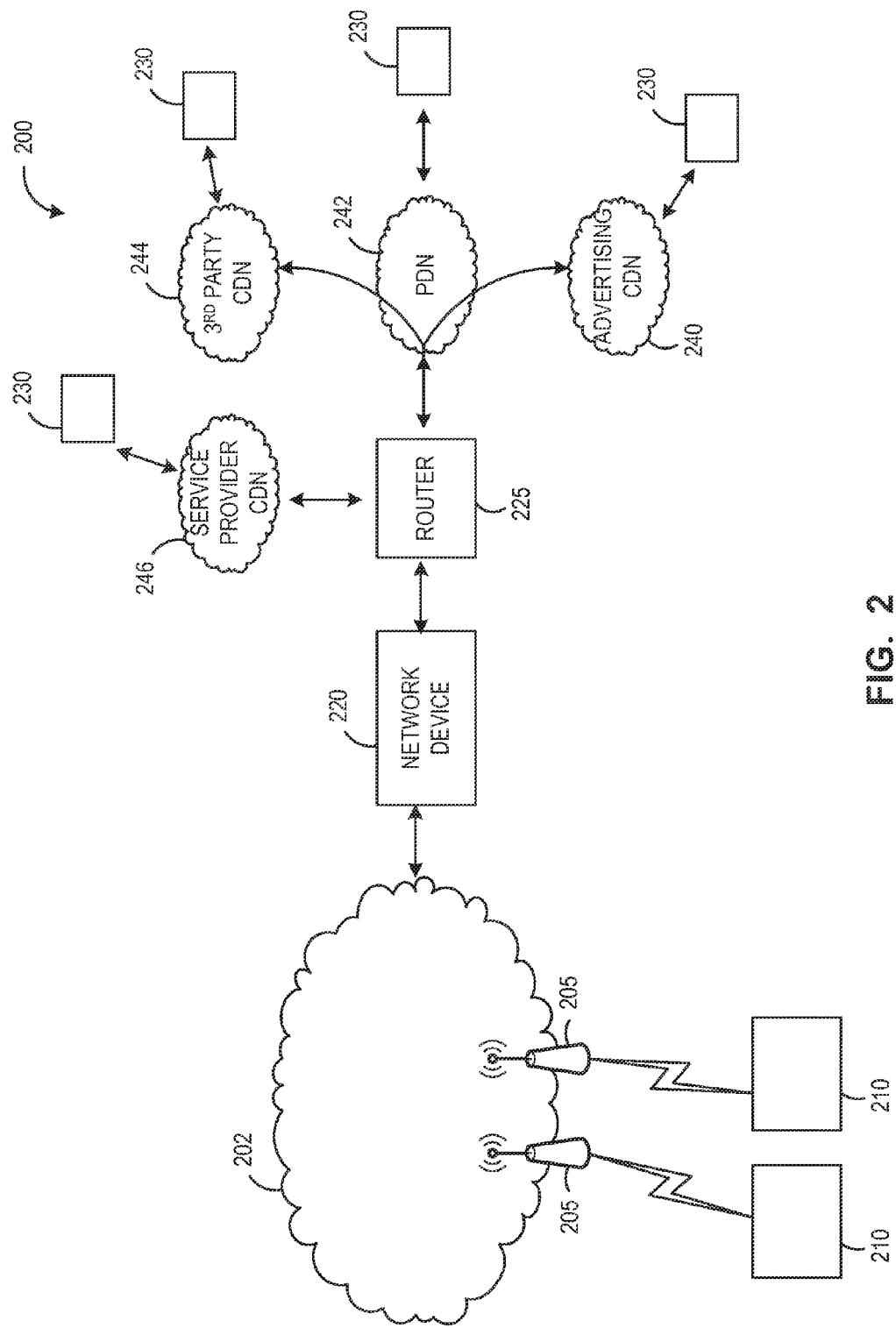
FIG. 2 is a block diagram of a TCP system in accordance with an example embodiment.

Reference is next made to FIG. 2, illustrating a block diagram of a TCP system 200 in accordance with some embodiments. System 200 generally comprises a network device 220 that interfaces, by way of one or more router 225, between one or more delivery networks and a mobile data network 202.

System 200 comprises client devices 210, which may be any networked computing devices such as the first host device 110 of FIG. 1A. In this exemplary embodiment, the client devices 210 may request data, such as, for example, multimedia or media content, from data servers 230.

Advertising content delivery network (CDN) 240, primary delivery network 242, third party CON 244, service provider CDN 246, and mobile data network 202 may comprise data networks capable of carrying data, such as the Internet, public switched telephone network (PSTN), or any other suitable local area network (LAN) or wide area network (WAN). In particular, mobile data network may comprise a Universal Mobile Telecommunications System (UMTS), 3GPP Long-Term Evolution Advanced (LTE Advanced) system, Worldwide Interoperability for Microwave Access (WiMAX) system, other 3G and 4G networks, and their equivalent and successor standards.

Mobile data network 202 may comprise a plurality of base transceiver stations 205, which are operable to communicate with individual client devices 210.

Networks 240, 242, 244 and 246 may comprise content delivery networks. In some embodiments, one or more of networks 240, 242, 244 and 246 may be merged or incorporated into one another as part of a single network.

In general, a content delivery network comprises a plurality of nodes. Each node may have redundant cached copies of content that is to be delivered upon request. The content may be initially retrieved from a data server 230 and subsequently cached at each node according to a caching or retention policy.

CDN nodes may be deployed in multiple geographic locations and connected via one or more data links (e.g., backbones). Each of the nodes may cooperate with each other to satisfy requests for content by clients while optimizing delivery. Typically, this cooperation and delivery process is transparent to clients.

In a CDN, client requests for content may be algorithmically directed to nodes that are optimal in some way. For example, a node that is geographically closest to a client may be selected to deliver content. Other examples of optimization include choosing nodes that are the fewest number of network hops away from the client, or which have the highest current availability.

Data server 230 may comprise one or more servers equipped with a processor and memory storing, for example, a database or file system. Data server 230 may be any server that can provide access to data, such as media content, upon request by, for example, storing the content, such as the second host 130 of FIG. 1A.

Although the exemplary embodiments are shown primarily in the context of mobile data networks, it will be appreciated that the described systems and methods are also applicable to other network configurations. For example, the described systems and methods could be applied to data networks using satellite, digital subscriber line (DSL) or data over cable service interface specification (DOCSIS) technology in lieu of, or in addition to a mobile data network.

Figure 3B:
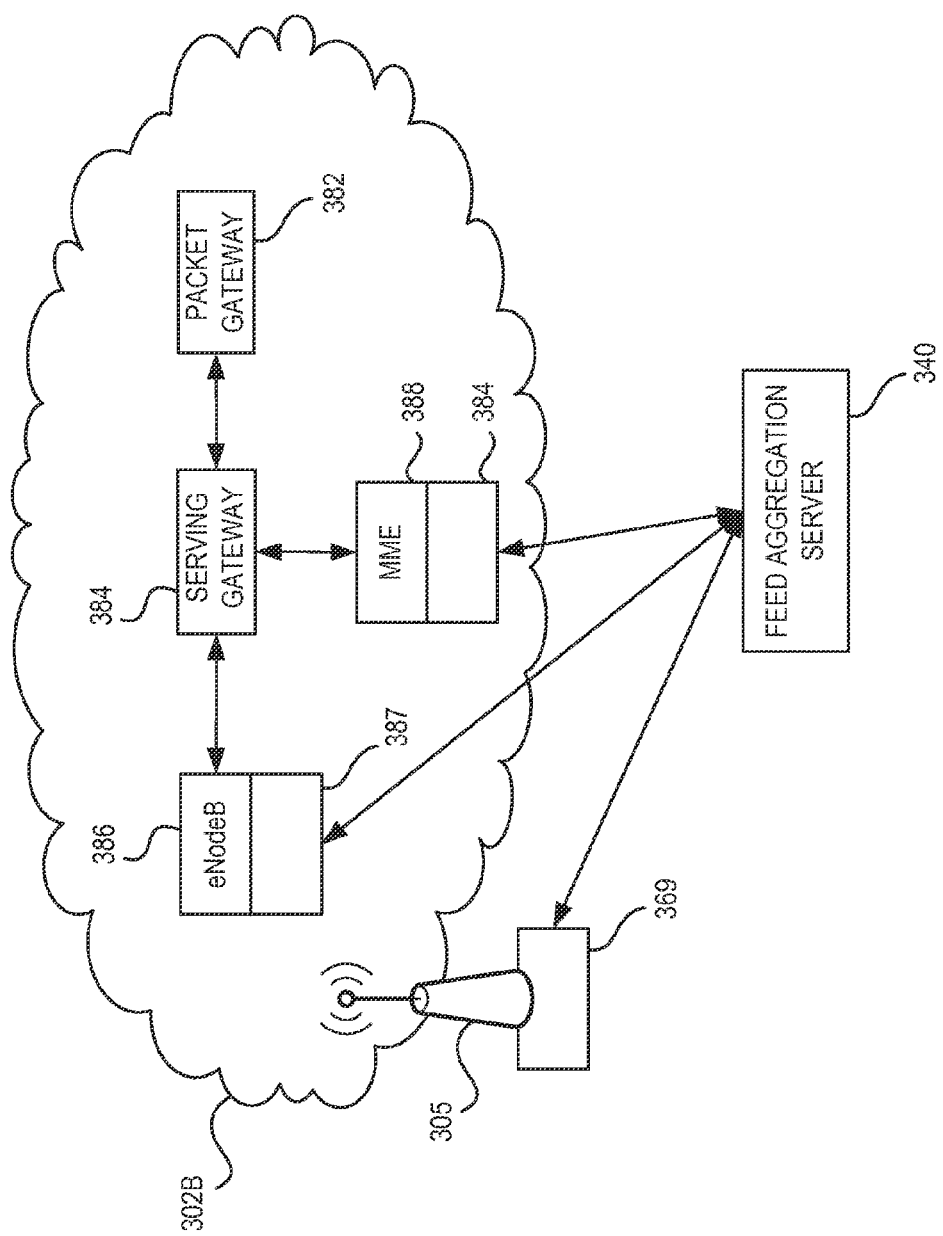
FIG. 3B is another example implementation of a mobile data network in accordance with the system of FIG. 2.

Referring now to FIGS. 3A and 3B, there are shown example implementations of a mobile data network in system 200.

Referring to FIG. 3A in particular, there is illustrated a mobile data network 302A, which may be a "3G" implementation of mobile data network 302 using a standard such as Universal Mobile Telecommunications System (UMTS).

Mobile data network 302A comprises support nodes including a serving GPRS support node (SGSN) 364 (where GPRS stands for General Packet Radio Service) and a gateway GPRS support node (GGSN) 362. Mobile data network 302A further comprises a radio network controller (RNC) 366. Various other network elements commonly deployed in a 3G mobile data network are omitted for simplicity and clarity.

Each mobile data network 302A may comprise a plurality of support nodes and radio network controllers.

Reference points, node taps and feeds (365, 367 and 369) may be provided for each SGSN 364, RNC 366 and base transceiver station 305, and used to provide input data and statistics regarding, for example, user plane data and control plane data to a feed aggregation server 340. Data may be gathered inline using one or more respective approaches.

Generally, user plane data may be considered to be "payload" data or content, such as media data. Conversely, control plane data may be signaling and control information used during a data communication session.

In a first approach, an inline, full user plane traffic mode may be used (as shown in FIG. 3A), in which full, but separate, user plane and control plane data is monitored and provided to network device 220, for example via feed aggregation server 340. In such an approach, the monitoring may be active in the user plane, but passive in the control plane. One example of control plane monitoring is the use of a Radio Access Network (RAN) data feed 367 to capture and provide signaling information from RNC 366.

The availability of control plane data facilitates better optimization by network device 220, by providing information about device mobility and location, among other things.

In another approach, an inline, partial user plane traffic mode may be used (not shown), in which another inline node (e.g., gateway or deep packet inspection router) redirects a subset of monitored traffic to the network device 220. In this approach, control plane data may not be available.

In a further approach, an inline, full and combined user and control plane traffic mode may be used (not shown), in which user and control plane data is monitored and redirected in a combined feed.

Accordingly, input data and statistics may be obtained from the user plane (e.g., content data) or from the control plane used for signaling information with the client device. The monitored data may be in the form of conventional Internet Protocol (IP) data traffic or in the form of tunneled data traffic using a protocol such as Generic Routing Encapsulation (GRE), GPRS Tunnelling Protocol (GTP), etc.

Control plane data may be used to extract data about the client device, including location and mobility, device type (e.g., International Mobile Equipment Identity [IMEI]) and subscriber information (e.g., International Mobile Subscriber Identity [IMSI] or Mobile Subscriber Integrated Services Digital Network Number [MSISDN]). Control plane data may also reveal information about the RAN, including number of subscribers using a particular node, which can be an indicator of congestion.

Referring now to FIG. 3B, there is illustrated a mobile data network 302B, which may be a "4G" implementation of mobile data network 202 using a standard such as 3GPP Long Term Evolution (LTE). Mobile data network 302B is generally analogous to mobile data network 302A, except that network elements with different capabilities may be provided.

Mobile data network 302B comprises gateways including a serving gateway 384, and a packet gateway 382. Mobile data network 302B further comprises an Evolved Node B (eNodeB) 386 and a mobile management entity (MME) 388. Various other network elements commonly deployed in a 4G mobile data network are omitted for simplicity and clarity.

Each mobile data network 302B may comprise a plurality of gateways, eNodeBs and MMEs.

Reference points, node taps and feeds (384, 387 and 389) may be provided for each MME 388, eNodeB 386 and base transceiver station 305, and used to provide input data and statistics to a feed aggregation server 340. Data may be gathered inline using one or more respective approaches as described herein.

Figure 4:
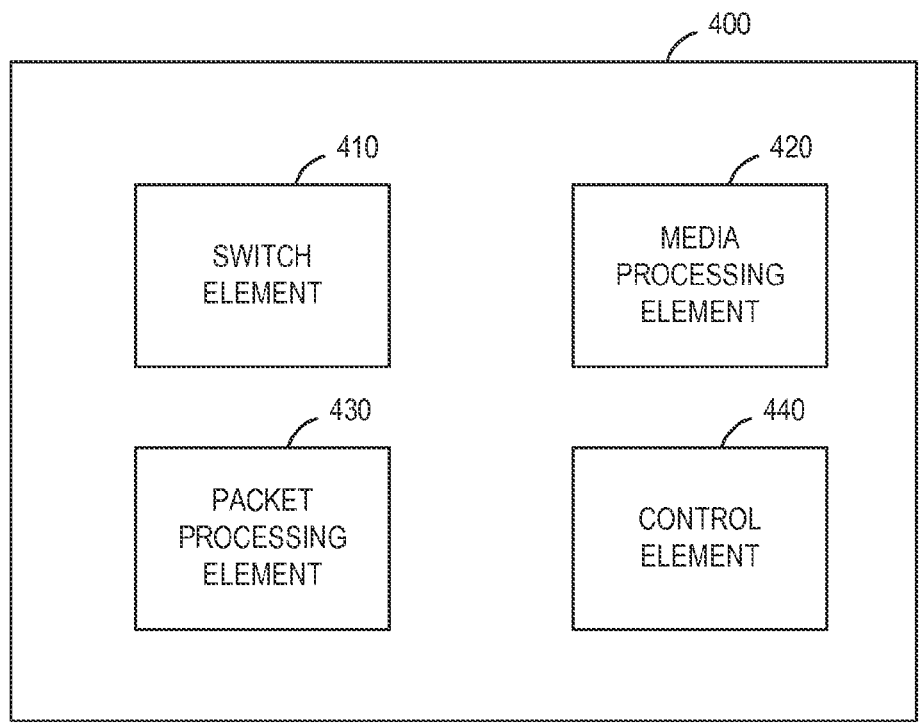
FIG. 4 is a simplified block diagram of a network device in accordance with an example implementation.

Reference is next made to FIG. 4, illustrating a simplified block diagram of a network device 400, which is an example implementation of network devices 122, 220 of FIGS. 1 to 4.

Network device 400 is generally configured to identify media sessions in generic network data traffic, to permit selective media session-based policy execution and traffic management of in-progress communication sessions ("flows"). This is a significant enhancement over conventional per-flow or per-subscriber application of policies, in which policies are applied to individual flows (on a per packet or per flow basis) or applied to all data for a particular subscriber (per subscriber). Network device 400 may be configured to determine and enforce media session-based policies to balance the overall quality of experience (QoE) and network utilization for all users, based on the service provider's policy constraints. Determinations and enforcement can be performed by working in a closed-loop mode, using continuous real-time feedback to optimize and tune individual media sessions. In conjunction with detailed media session analysis and reporting, network device 400 may provide control and transparency to service providers attempting to manage rapidly growing media traffic on their network.

To accomplish this, network device 400 performs a number of functions that would conventionally be implemented via separate interconnected physical appliances. Implementation in an integrated architecture, which supports a wide range of processor options, is beneficial in order to reduce cost while improving performance and reliability. Accordingly, network device 400 may comprise one or more switch elements 410 one or more media processing elements 420, one or more packet processing elements 430, and one or more control elements 440 in an integrated platform. In some embodiments, the function of one or more of switch elements 410, media processing elements 420, packet processing elements 430 and control elements 440 may be integrated, such that a subset of the elements implements the entire functionality of media service gateway 400 as described herein. In some embodiments, one or more of the elements may be implemented as a server "blade", which can be coupled together via a backplane. Each of the elements may comprise one or more processors and memories.

Switch elements 410 may be configured to perform control and data plane traffic load balancing across packet processing elements. Each switch element 410 may comprise one or more load balancers configured to distribute traffic from a large number of subscribers evenly across one or more packet processing elements 430. The traffic may be re-balanced between one or more packet processing elements 430 in the event of a packet processing blade 430 failure.

Switch elements 410 may be configured to operate the network device 400 in one or more of a number of intersection modes. The intersection modes may permit passive monitoring of traffic, active management of traffic, or a combination thereof, for example by using an appropriate virtual local area network (VLAN) configuration.

Switch elements 410 may provide input/output facilities for intersecting multiple data links within a network in a transparent, bump-in-the-wire configuration. In order to accomplish this, switch elements 410 may mark packets when they are received by the network device 400 in order to identify the source data link, and the direction. Such internal marking can be reversed or deleted before the respective packets are re-enqueued on the wire. Packets may be internally marked in a number of ways, such as VLAN tags, reversible manipulation of source or destination or both MAC addresses, and adding encapsulation headers (using standard or proprietary protocols). The additional information encoded in the packet marking allows each packet to carry the information necessary to direct it to the correct output port without the need for large amounts of internal storage or complex, time-consuming lookups.

Media processing element 420 may be configured to perform inline, real-time, audio and video transcoding of selected media sessions. Media processing elements 420 may also be configured for an off-line, batch conversion workflow mode. Such an offline mode can be used to generate additional streams for a particular media content item at a variety of bit rates and resolutions as idle resources become available. This can be desirable where a particular media content item is frequently delivered to different client devices in a variety of network conditions.

Media processing element 420 may comprise one or more general purpose or specialized processors. Such specialized processors may be optimized for media processing, such as integrated media processors, digital signal processors, or graphics processing units.

Such processors operate on media processing element 420 and may implement individual elementary stream transcoding on a per-segment basis. A segment can be defined as a collection of sequential media samples, which starts at a selected or random access point. The processors may exchange control and configuration messages and compressed media samples with one or more packet processing elements 430.

Media processing element 420 may generally perform bit rate reduction. In some cases, media processing element 420 may perform sampling rate reduction (e.g., spatial resolution and/or frame rate reduction for video, reducing sample frequency and/or number of channels for audio). In some other cases, media processing element 420 may perform format conversion for improved compression efficiency, whereby the output media stream being encoded may be converted to a different, more efficient format than that of the input media stream being decoded (e.g., H.2641AVC vs. MPEG-4 part 2).

In some cases, a plurality of processors may operate concurrently in the same media processing element 420 to provide multi-stream transcoding. In some other cases, the processors for a single media session may be invoked across multiple hardware resources, for example to parallelize transcoding over multiple cores or chips, or to relocate processing in case of hardware failure. Parallelization may occur at the direction of a session controller running on packet processing element 430.

In some cases, media streams may be modified to comprise alternative media stream content, such as inserted advertisements or a busy notification signal.

Control elements 440 may generally perform system management and (centralized) application functions. System management functions may include configuration and command line interfacing, Simple Network Monitoring Protocol (SNMP) alarms and traps and middleware services to support software upgrades, file system management, and system management functions. Control elements 440 may generally comprise a processor and memory configured to perform centralized application functions. More particularly, control element 440 may comprises a global policy engine, a network resource model (NRM) module, a transcoder resource manager (XRM) and a statistics broker.

Centralization of this processing at control element 440 may be advantageous as, due to load balancing, no single packet processing element 430 generally has a complete view of all sessions within a given network device, nor a view of all network devices.

The policies available at the network device 400 may be dynamically changed by, for example, a network operator. In some cases, the global policy engine of the control element 440 may access policies located elsewhere on a network. For example, the global policy engine may gather media session policies based on the 3rd Generation Partnership Project (3GPP) Policy Control and Charging (PCC) architecture ecosystem (e.g., with a Policy and Charging Rules Function (PCRF)). In such embodiments, the policy system may enforce policy (i.e., carry out a Policy Control Enforcement Function (PCEF) with Application Function (AF), or Application Detection and Control (ADC)).

The global policy engine may maintain a set of locally configured node-level policies, and other configuration settings, that are evaluated by a rules engine in order to perform active management of subscribers, locations, and media sessions. Media sessions may be subject to global constraints and affected by dynamic policies triggered during the lifetime of a session. Accordingly, the global policy engine may keep track of live media session metrics and network traffic measurements by communicating with the NRM module. The global policy engine may use this information to make policy decisions when each media session starts, throughout the lifetime of the media session, or both, as the global policy engine may adjust polices in the middle of a media session due to changes, e.g. in network conditions, changes in business objectives, time-of-day, etc.

The global policy engine may utilize device data relating to the identified client device, which can be used to determine device capabilities (e.g., screen resolution, codec support, etc.). The device database may comprise a database such as Wireless Universal Resource File (WURFL) or User Agent Profile (UAProf).

The global policy engine may also utilize subscriber information. In some cases, subscriber information may be based on subscriber database data obtained from one or more external subscriber databases. Subscriber database data may include quotas and policies specific to the user and/or a subscription tier. The subscriber database may be accessed via protocols such as Diameter, Lightweight Directory Access Protocol (LDAP), web services or other proprietary protocols. Subscriber database data may be enhanced with subscriber information available to the network device 400, such as a usage pattern associated with the subscriber, types of multimedia contents requested by the subscriber in the past, the current multimedia content requested by the subscriber, time of the day the request is made and location of the subscriber making the current request, etc.

A by-product of location-based and media-session based policy is that location- and session-related measurements, such as bandwidth usage, QoE measurements, transcoding efficiency measurements, and network congestion status can be continuously computed and made available in real-time for the timeliness of policy decisions. Network device 400 may implement these functions through the NRM module.

The NRM module may implement a hierarchical subscriber and network model and load detection system that receives location and bandwidth information from packet processing elements 430 or from external network nodes, such as radio access network (RAN) probes, to generate and update a real-time model of the state of a mobile data network, in particular congested domain, e.g. sectors. The network model may be based on data from at least one network domain, where the data may be collected by feed aggregation server 340 using one or more node feeds or references points. The NRM module may implement a location-level congestion detection algorithm using measurement data, including location, RTT, throughput, packet loss rates, window sizes, and the like from packet processing elements 430. The NRM module may then provide the global policy engine with the currently modeled cell load for one or more cells.

NRM module may also receive per-session statistics such as session bandwidth utilization and quality metrics from packet processing elements 430 for ongoing session tuning and aggregate limit control. It may also receive updates from a control plane processor to enable mapping subscribers and associated traffic and media sessions to locations.

XRM may cooperate with the global policy engine to allocate a media processor from the pool of media processors available in the system, and to identify the available transcoding capabilities to other elements of the network device 400, in terms of supported configurations and expected bitrate and quality levels. Resource allocation function may fulfill requests from the global policy engine for transcoding resources and manage the status of the media processors. It may determine free media processors when a session is complete, receive updates on the state of the media processors and make determinations about turning on or off processors.

XRM maintains information about the media processing capabilities of the media processors, and available software versions, and can be configured to advertise these capabilities to other elements of the network device 400. It may have a role in deciding appropriate transcoding configurations, both initially and dynamically throughout a session.

Statistics broker may be configured to generate and output statistics and report data, such as call data records (CDR) or user data records (UDR) regarding the operation of the network device 400 to a remote device. Reported data may include data such as transcoding resolutions, bitrates, etc. Additional reported data may include data used by an analytics engine as described in co-pending U.S. patent application Ser. No. 13/191,629, the entire contents of which are hereby incorporated by reference.

Packet processing element 430 may be generally configured to analyze network traffic across all layers of the TCP/IP (or UDP/IP, or other equivalent) networking stack, identify media sessions, and apply policy. To facilitate processing with minimal latency and maximum throughput, packet processing workloads may be divided into fast-path and slow-path modules, which provide separate threads of execution. Using a single thread of execution to process every packet may result in excessive latency for packets that require significant processing and also fail to take advantage of parallelization.

Figure 5:
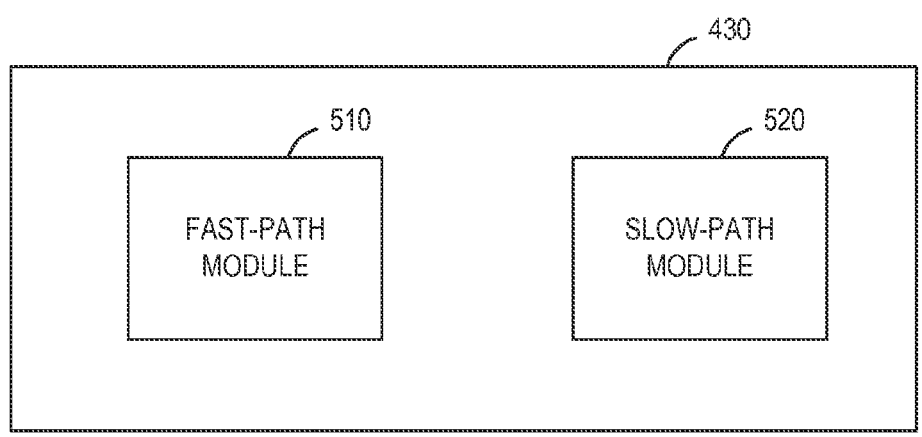
FIG. 5 is a simplified block diagram of a packet processing element in accordance with an example implementation.

Referring now to FIG. 5, there is illustrated a simplified block diagram of a packet processing element, which is an example implementation of the packet processing element 430 of FIG. 4.

Packet processing may be divided into two (or more layers), where the base layer may be processed in a fast-path module 510 and one or more additional layers processed in a slow-path module 520. The fast-path module 510 implements a first stage of packet processing, which requires only a minimal amount of computational effort. Packets that do no require advanced processing may be forwarded immediately at this stage and are re-enqueued "back to the wire" with very low latency. Packets that require additional processing can be forwarded to a slow-path module 520 for deeper processing. Slow-path processing may be performed independently of, or in parallel with, the fast-path processing, such that slow-path processing does not block or impede fast-path processing.

There may be one or more fast-path modules 510 per packet processing element 430, Fast-path module 510 may receive packets from, such as, for example, a network interface, a load balancer, etc. Fast-path module 510 may implement a high performance tinier system in order to "time-out" or expire flows and media sessions. Fast-path module 510 may identify and parse IP layer data (IPv4/IPv6) in each packet, perform IP defragmentation, and associate the packets with their appropriate layer-4 UDP or TCP flows.

The fast-path module 510 may support multiple flow states, such as "forward", "tee", "vee", and "drop". In the forward state, packets are re-enqueued to the network interface for immediate transmission, without processing by slow-path module 520. Fast-path module 510 may look up a subscriber or flow information associated with the packet and decide whether the packet should be forwarded based on such information.

In the tee state, packets are both re-enqueued to the network interface for immediate transmission and copied to a slow-path module 520 for further processing. In the vee state, packets are delivered to a slow-path module 520 for further processing. After processing, the slow-path module 520 may return one or more packets to fast-path module 510 to be re-enqueued to the network interface for transmission. Accordingly, in the vee or inline mode, packets may be considered as being processed inline, that is, processed first before being forwarded in modified or unmodified form to the original destination.

Fast-path module 510 may implement packet marking, governed by policy. Marking is performed to manage network traffic by assigning different traffic priorities to data. Fast-path module 510 may also implement shaping and/or policing, in accordance with a policy. Shaping and policing are tools to manage network traffic by dropping or queuing packets that would exceed a committed rate. Marking, shaping and policing may be subscriber-based, device-based, location-based, or media-session based, for example, where all flows belonging to a particular location or to a particular device or media session may be marked, policed and/or shaped identically.

Generally, a slow-path module 520 sends and receives messages to and from a fast-path module 510. Slow-path module 520 parses the application layer of received/sent packets, and executes policy based on subscriber, device, location or media session analysis and processing, for example, as determined by the slow-path processing.

Figure 6:
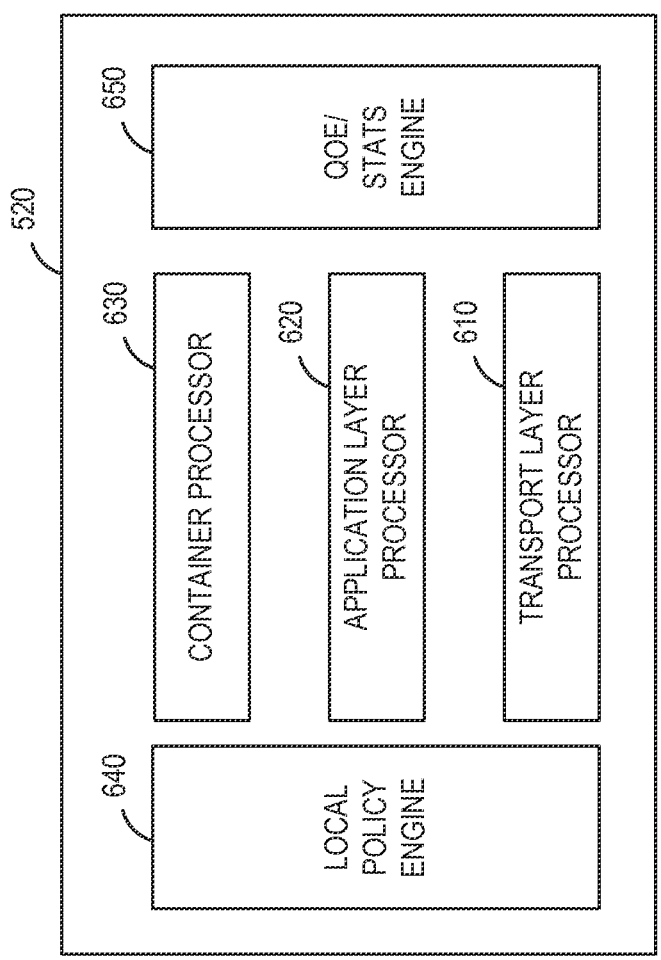
FIG. 6 is a block diagram of a slow-path module in accordance with an example implementation.

Reference is next made to FIG. 6 illustrating a simplified block diagram of a slow-path module, which is an example implementation of a slow-path module 520 of FIG. 5. The slow-path module 520 may comprise a transport layer processor 610, an application processor 620 and a container processor 630. Slow-path module 520 may further comprise a local policy engine 640 and QoE and statistics engine 650.

Transport layer processor 610 may parse the transport layer (e.g. TCP, UDP, etc.) and keep track of when packets are sent and received, including when packets are acknowledged (or lost) by the client, to permit modeling of the client video buffer, for example, as described in U.S. application Ser. No. 13/231,497, entitled "Device with video buffer modeling and methods for use therewith", the entire contents of which are hereby incorporated by reference. Transport layer processors 610 may also reconstruct the data for the application layer and invoke appropriate application layer processors (e.g., HTTP) by examining incoming data from both directions. Additional features of transport layer processor 610 are described further herein with reference to FIGS. 7 to 9B. In some embodiments, transport layer processor 610 may provide functions associated with a TCP proxy as described herein, in conjunction with other elements of slow-path module 520.

Application processor 620 may be configured to operate on certain types of detected application layer content, such as HTTP, RTSP and RTMP. Once the application type has been identified, transport layer processors 610 may largely delegate subsequent payload parsing to the application layer processors 620. Application layer processors 620 may be responsible for identifying and delegating to appropriate session controllers when media sessions are detected, and for relating flows, characteristic interactions and streams to particular sessions.

A media session may generally be considered to have been identified once sufficient traffic relating to that media session has been observed at the application layer. In most cases, the application layer protocols used for media streaming can generally be identified by analyzing the first few bytes of payload data. After identifying the application payload, the payload can be parsed to find the media content, if any. This can be performed by dividing the communication into independent interactions, which may correspond to individual request/response pairs. Each interaction is evaluated to determine if the content is streaming media. If the interaction contains streaming media, it is further analyzed to extract media characteristics. Those interactions sharing common media characteristics may be encapsulated into streams. A media session may comprise a collection of one or more streams.

Container processor 630 may parse, analyze and process media containers such as FLV, MP4, ASF and the like. In some variant embodiments, it may also parse, analyze and process associated metadata such as gzipped content, manifest files, and the like. A container processor can analyze media containers and associated metadata without producing output, for statistics collection or QoE calculation. A container processor can also produce a new media container, which may differ from the source container in its format or content, via de-multiplexing, transcoding, and re-multiplexing. A container processor can also produce new metadata. The decision of whether to analyze or produce a new container can be governed by policy. Generally, media sessions should be identified relatively soon after the container processor starts parsing the input container.

Local Policy Engines 640 (LPE) may be deployed on every packet processing element 430 and act as a Policy Enforcement Points (PEP). LPE 640 sends policy requests to the global policy engine of control element 440 and receives and processes policy responses from the global policy engine. LPE 640 may provide local policy decisions for slow-path module 520 allowing slow-path module 520 to implement access control (i.e. whether to allow the media session), re-multiplexing, request-response modification, client-aware buffer shaping, transcoding, adaptive streaming control, in addition to the more conventional per-flow action such as marking, policing/shaping and the like. Media session policy actions may be further scoped, that is, applied only to specific sites, devices, resolutions, or constrained, that is, subject to minimum/maximum bit rate, frame rate, QoE targets, resolution, and the like, as described herein.

Slow-path module 520 may implement access control, in accordance with a policy. In situations where network resources are scarce and/or the QoE for the new media session is expected to be poor, an access control policy may deny service to the new media session. In addition to denying a media session, providing some form of notification to the subscriber such as busy notification content may reduce the negative impact of the policy on the subscriber's satisfaction.

Slow-path module 520 may implement re-multiplexing in accordance with a policy. A re-multiplexing policy can convert a media session from one container format to another. This action may be useful to allow for the future possibility of transcoding the media session or to convert the media format to align with the client device's capabilities.

Slow-path module 520 may implement request-response modification, in accordance with a policy. Request-response modification may involve modifying either the client request or the response. For example, request-response modification may replace requests for high definition content with similar requests for standard definition content.

Slow-path module 520 may implement client-aware buffer shaping, in accordance with a policy. Client-aware buffer shaping uses the client buffer model generated by QoE and statistics engine 650 to prioritize computing and network resources within the network device, to ensure smooth playback for all client devices that are served concurrently. For example, if client A has 10 seconds of content in a buffer, client B has 60 seconds of content in a buffer, and client C has 2 seconds of content in a buffer, client-aware buffer shaper may prioritize transmission for client C ahead of transmission for clients A and B, and further prioritize client A ahead of client B.

Slow-path module 520 may implement transcoding, in accordance with a policy. When a transcode policy action is selected for the session, the session controller may perform dynamic control of a transcoder to conform to policy targets and constraints. In some cases, it may further implement a feedback control mechanism for a video transcoder to ensure that the media session achieves targets and constraints set out in the policy engine, such as a transcoded video bit rate, transcoded video QoE, etc. The controller reevaluates its control decisions periodically or when it receives a policy update.

In some cases, slow-path module 520 may support allowing a media session to be initially passed through unmodified, but later transcoded due to changes in policy, network conditions including sector load and/or congestion, or the measured QoE. Control elements 440 may also be able to move a transcode session from one resource to another, for example if a less loaded resource becomes available. As such, media resources may be allocated by the control elements 440 on a segment basis, rather than for an entire elementary stream.

Slow-path module 520 may also implement adaptive streaming control, in accordance with a policy. Adaptive stream control may employ a number of tools including request-response modification, manifest editing, conventional shaping or policing, and transcoding. For adaptive streaming, request-response modification may replace client segment requests for high definition content with similar requests for standard definition content. Manifest editing may modify the media stream manifest files in response to a client request. Manifest editing may modify or reduce the available operating points in order to control the operating points that are available to the client. Accordingly, the client may make further requests based on the altered manifest. Conventional shaping or policing may be applied to adaptive streaming to limit the media session bandwidth, thereby forcing the client to remain at or below a certain operating point.

The QoE and statistics engine 650 may generate statistics and QoE measurements for media sessions, may provide estimates of bandwidth required to serve a client request and media stream at a given QoE, and may make these values available as necessary within the system. Examples of statistics that may be generated comprise, e.g., bandwidth, site, device, video codec, resolution, bit rate, frame rate, clip duration, streamed duration, audio codec, channels, sampling rate, and the like. QoE measurements computed may comprise, e.g., delivery QoE, presentation QoE, and combined QoE.

The raw inputs used for statistics and QoE measurements can be extracted from the traffic processors at various levels, including the transport, application, and media container levels. For example, in the case of a progressive download over HTTP, the container processor detects the locations of the boundaries between video frames and, in conjunction with the transport processor, determines when entire media frames have been acknowledged by the subscriber device to have arrived. The application processor provides information on which client device is being used, and playback events, such as the start of playback, seeking, and the like.

A primary component of delivery QoE measurement is a player buffer model, which estimates the amount of data in the client's playback buffer at any point in time in the media session. It uses these estimates to model location duration and frequency of stall events.

Not all embodiments of the described slow-path module need include all elements described in the example embodiment of FIG. 6. For example, some embodiments of the slow-path module may include only a transport layer processor and application layer processor. Moreover, in some embodiments, slow-path module 520 may be implemented in a network device that omits certain elements of network device 400. For example, in some embodiments, slow-path module 520 may be implemented in a network device that lacks a media processing element 420.

Figure 7:
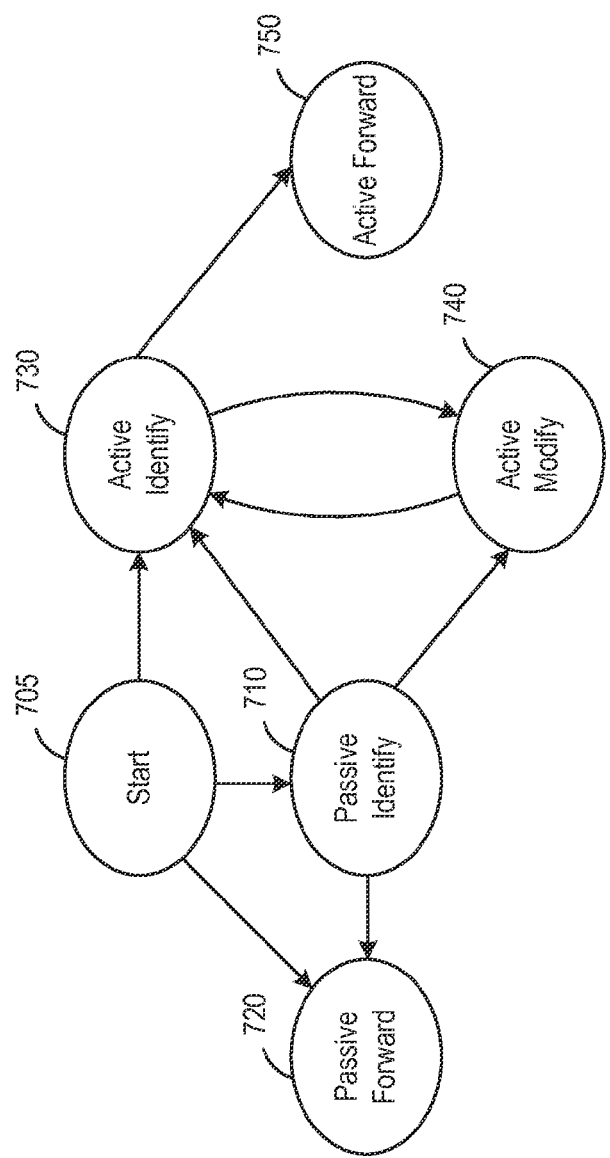
FIG. 7 is a state diagram for a slow-path module in accordance with an example implementation.

Reference is next made to FIG. 7 illustrating a state diagram for a communication flow (e.g., "TCP flow") managed by a slow-path module, such as slow-path module 520 of FIGS. 5 and 6. More particularly, each TCP communication flow can be managed by a transport layer processor, such as transport layer processor 610. Each transport layer processor may manage a plurality of TCP communication flows—in some cases thousands of flows—between a client and server, such as host 110 and host 130 of FIG. 1A. Each TCP communication flow may occupy a passive identify state 710, a passive forward state 720, an active identify state 730, an active modify state 740 and an active forward state 750.

A TCP communication flow may be initialized 705 in various configurations. In some cases, transport layer processor 610 may be configured to initialize TCP flows in a passive identify state 710 by default. The passive identify state 710 is a forwarding state in which flow data is not modified, but in which slow-path module 520 (through transport layer processor 610) monitors the TCP connection state between the communicating hosts, analyzes flow data, and attempts to determine whether to place the current flow into an active state based on session demographics or some other control signal. In the passive identify state 710, the slow-path module 520 neither modifies packet payloads nor injects packets into a flow.

While a TCP flow is in the passive identify state 710, slow-path module 520 can analyze whether a predetermined content type is contained in the flow data (e.g., a predetermined content type that corresponds with data to be modified), and decide whether to place the current flow into an active state so that the packet can be modified. The predetermined content type may be video data or a data characteristic of a media session (e.g., media metadata).

One example heuristic for determining whether the packet contains a predetermined content type may be based on the destination port to which a network packet is addressed. For example, the host port of the data packer may be compared to a known list of ports that are known to be associated with media sessions to determine whether a predetermined content type is contained in the data packet. Examples of such media-associated ports may include ports 80, 81, 82, 8080, 8081, 8090 for HTTP applications, ports 554, 8554 for RTSP applications and port 1935 for RTMP applications.

TCP flows may also be placed into an active state, such as the active identify state 730, in response to a control signal. The control signal may be manually triggered by, for example, a human operator. In other cases, the control signal may originate from other elements of the network device 400. For example, a "time of day" policy may cause a policy engine to transmit a control signal indicating that some or all TCP flows should be placed into an active identify state 730 at certain times of the day. In another example, the NRM module may transmit a control signal indicating that some or all TCP flows should be placed into an active identify state 730 in response to the detection of network congestion.

More generally, a content identifier of slow-path module 520 may be used to reassemble flow data, which can then be analyzed to identify session demographics, such as application headers (e.g. HTTP Content-Type), message body (e.g. a video file), content metadata (e.g., video resolution). The session demographics can be used to determine if the current flow should be switched from the passive identify state 710 to an active state, under the direction of local policy engine 640.

If the slow-path module 520 determines that the current data flow data does not contain a predetermined content type, the current flow may instead be placed into a passive forward state 720. In the passive identify state 710, an emphasis may be placed on minimizing processing latency. Accordingly, packet and flow analysis may be limited to heuristics that require relatively little computational effort.

In the passive forward state 720 packets are forwarded to the network interface with minimal latency, which generally indicates that no additional processing of the packets is performed. Effectively, while a TCP flow is in the passive forward state 720, the slow-path module 520 behaves similarly to the fast-path module 510.

In some cases, passive forward state 720 may be a default fallback state for a TCP flow, and may be entered from state 710 in case of any error in the passive identify state 710. Such errors may include parsing errors, software exceptions, etc.

While a TCP flow is in the passive identify 710 or passive forward state 720, slow-path module 520 generally inspects all packets delivered between the two hosts, buffering them locally while, for example, the application layer processor 620 and/or container layer processor 630 analyzes the bytestreams, and then forwards the packets in unmodified form to the intended recipient host. In many cases, the TCP flow will never exit the passive state, allowing the two remote hosts to communicate directly with each other using only minimal resources of the slow-path module 520. For example, if the slow-path module 520 is implemented as a caching HTTP gateway, all TCP flows may be kept in a passive state for all connections where the requested content is not available in a local cache. This greatly reduces the amount of processing required at the intermediate device, since the remote hosts manage the responsibility of sending acknowledgments, timing transmissions, and other actions associated with TCP communication.

In some cases, it may be difficult to make a determination regarding the content of a TCP flow within a short predetermined identification period. For example, exceeding the identification period may result in the sending host deciding to retransmit packets because no ACK packets have been received. Accordingly, TCP flows may sometimes be placed in the active identify state 730 from a passive identify state 710 in the event that the slow-path module 520 is unable to determine whether the current data flow contains a predetermined content type within a predetermined identification period, or if slow-path module 520 has identified a predetermined content type, but needs more payload data to determine whether modification of the flow is required.

In both the passive identify state 710 and active identify state 730, slow-path module 520 can forward payload data between host devices. However, in both cases, slow-path module 520 can restrict forwarding of payload data until it determines whether to modify the payload content. Accordingly, the passive identify 710 and active identify states 730 can be thought of as an intelligent control valve, in which bytestreams are reassembled for analysis. Upon completing analysis, packets can continue to be forwarded in unmodified form (e.g., passive or active) or in modified form (e.g., active).

This restriction on forwarding payload data is particularly significant in cases where metadata about the size of a transmission is sent as part of a file header, and where the recipient host device will expect to receive data corresponding to the identified size. For example, a video the from an online streaming website may contain a media file size in the first packet that is transmitted. Accordingly, to preserve the ability to modify the TCP flow without disrupting the state of the TCP connection at either the sending host device or the recipient host device, the network device should defer forwarding payload data to the recipient host device until it can determine whether to modify the payload (and the first packet).

In an active identify state 730 (and in the active modify 740 or active forward states 750 described below), the slow-path module 520 separates the existing connection between the remote hosts into two independent connections, to allow it to transmit ACK packets to the sending host.

The active identify state 730 can be thought of as functionally similar to a conventional proxy, in that the network device establishes independent TCP connections with each host device, and manages communications between the two.

In some cases, a TCP flow may be placed in the active identify state 730 if the TCP connection reaches a deadlock. The deadlock may be caused by loss of segments of packets transmitted by the first and/or second hosts. For example, when a packet is dropped or lost, the receiving host sends duplicate acknowledgments (ACKs) to trigger a fast retransmit of the packet by the sending host. This prevents the sending host from experiencing a retransmit timeout and going back to a slow start. This may cause network performance degradation. To overcome this, the slow-path module 520 may place the TCP flow in the active identify state 730 whereupon the packet payload may either be forwarded (in active forward state 750) or modified (in active modify state 740).

In some other cases, the deadlock may occur because of network congestion. For example, if the application layer requires N octets of data before being able to forward any of it, and the congestion window is less that N, then a deadlock may occur.

Active modify state 740 is a full-control state in which the current data flow may be modified based on local or global policies, as discussed herein. For example, modification may include transcoding a media stream.

Slow-path module 520 may transition a TCP flow into the active modify state 740 if the slow-path module 520 makes a determination, for example in the passive identify state 710 or the active identify state 730, that the network data contains the predetermined content type and should be modified.

Active forward state 750 is an auto-forward state where the packet payloads are forwarded to the network interface by the slow-path module 520.

The active forward state 750 is similar to the passive forward state 720, and may be entered into if an active identification timeout period expires or the slow-path module 520 determines, while in the active identify state 730, that some or all of the current data flow should remain unmodified.

In active forward state 750, packets are forwarded to the network interface with minimal latency, which generally indicates that no additional processing of the packets is performed. Effectively, while in the active forward state 750, the connection between the two hosts has been proxied, but no modification of payload content is taking place.

In some cases, active forward stare 750 may be a default fallback state, and may be entered from state 730 (or state 740) in case of any error in the active identify state 730. Such errors may include parsing errors, software exceptions, etc.

Generally, by analyzing the connection between the two remote hosts while a TCP flow is in the passive identify state 710, and carefully restricting the packets delivered between the hosts until after the bytestream has been analyzed, for example, by the application layer processor 620 and/or container layer processor 630, the slow-path module 520 can defer the decision to place the TCP flow into an active state. The TCP flow may not be placed into an active state until well into the data transfer phase (or even until connection teardown, although there tends to be little value entering an active state at this point).

For applications where modifying the bytestream is only necessary in a small percentage of cases, the performance increase of leaving most TCP flows in a passive state can be very beneficial. For example, if network device 400 (and slow-path module 520) is configured to provide a caching HTTP gateway, it might only place a TCP flow in an active state if it detects that it could service a user request from a local cache, instead of forwarding the original request unmodified. Accordingly, the network device may simply place the individual selected TCP flow in an active state, which allows the application to send the requested content without further involving the remote host. Meanwhile, other TCP flows can remain in a passive state, which does not require maintenance of separate TCP connections by the network device.

Figure 8A:
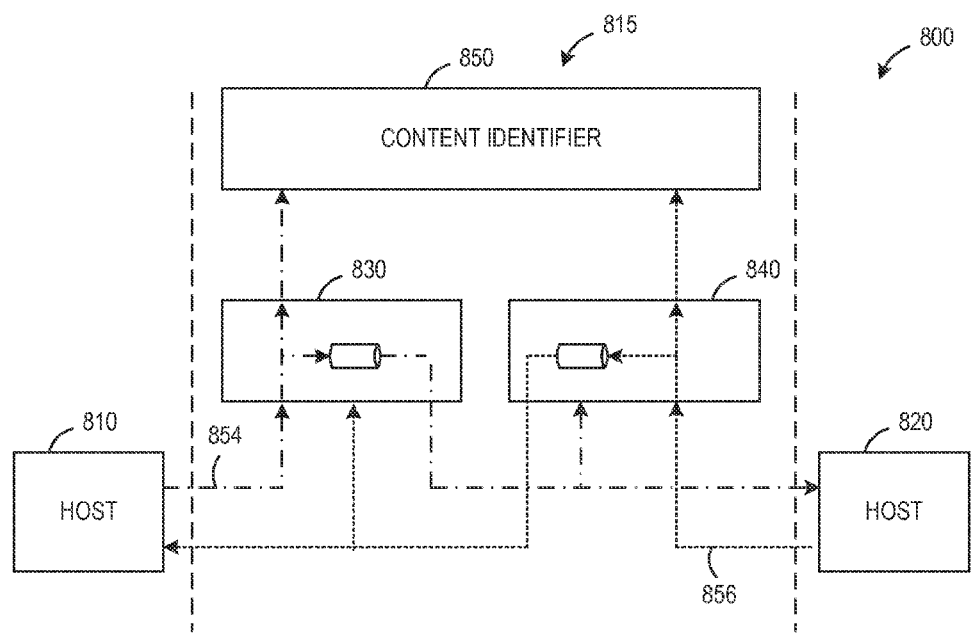
FIG. 8A is a communication flow diagram in a passive mode in accordance with an example implementation.

Reference is next made to FIG. 8A, illustrating a communication flow diagram 800 for a slow-path module, such as the slow-path module 520, for a TCP flow in a passive state. In a passive forward state, all packets are forwarded from one host to another without modification by an intermediate device (e.g., a network device 815) and no new packets are created or inserted into the flow. In a passive identify state, connection establishment packets are forwarded from one host to another, but the intermediate device restricts forwarding of payload data, while it undergoes analysis.

System 800 comprises a first host 810, a second host 820, and a network device 815. The network device 815 further comprises a passive transmission control module (passive TCM) 830 associated with the first host 810, a passive TCM 840 associated with the second host 820 and a content identifier module 850. Each passive TCM may be a software or hardware module. In the case of a software-based passive TCM, each such passive TCM may be a separate process executed by a processor of the network device 815, which is spawned when a new flow is to be analyzed.

As illustrated, packets, such as a request for multimedia content, are transmitted from the first host 810 destined for the second host 820. Within slow-path module, these packets may be copied and forwarded further, generally following a path 854 as illustrated in FIG. 8A using a broken line. Accordingly, request data is copied to passive TCM 830, passive TCM 840 and content identifier 850. In some cases, packets sent by first host 820 may be stored by passive TCM 830.

Response packets are transmitted from the second host 820 to the first host 810. Within slow-path module, these packets may be copied and forwarded further, generally following a path 856 as illustrated in FIG. 8A using a stippled line. Accordingly, response data is copied to passive TCM 830, passive TCM 840 and content identifier 850. In some cases, packets sent by second host 820 may be stored by passive TCM 840.

Passive transmission control modules 830 and 840 may be software modules that observe all network traffic sent and received by the first and second hosts. Generally, the passive transmission control modules and content identifier 850 execute some or all functions associated with the passive identify 710 or passive forward state 720, as described with reference to FIG. 7.

The passive transmission control module 830 observes traffic sent and received by the first host 810. The passive transmission control module 840 observes traffic sent and received by the second host 820. Each TCM maintains an estimate of the TCP connection state of both remote hosts. Preferably, each TCM maintains the exact state of the transport-layer conversation, which can be determined from the packets exchanged between the two hosts.

The packets sent and received by each host may be accounted for in the form of counts, such as, for example, a count of the number of packets and bytes received per interface, per protocol, per location or in total. Other counts may include packets and bytes forwarded unmodified, packets and bytes received in the active state (such as in active identify 730 and active modify state 740 from the passive identify state 710), packets and bytes forwarded in the active state (such as in active forward state 750), and packets and bytes dropped per input interface etc.

Passive transmission control modules 830 and 840 may also prepare and update models of the data sent and received by the first 810 and second 820 hosts. For example, passive transmission control modules 830, 840 may receive TCP packets and update their states in two ways: by informing the model of the sending stack that it has sent the packet; and by informing the model of the receiving stack that it may receive the packet depending on whether or not the packet gets dropped on its way to the receiver.

Passive transmission control modules 830 and 840 also send a copy of data to the content identifier 850. Content identifier 850 is a module that analyzes the data received by the passive transmission control module 830 and 840 to determine if the connection between the hosts should be manipulated.

The decision to manipulate the connection between the hosts may be based on the determination of whether the incoming packets contain a predetermined content type, as described herein.

In some cases, the TCP connection between the hosts may be manipulated if the TCP connection is in a deadlock, as discussed above. In some other cases, the TCP connection may be manipulated if more analysis is required to determine whether the packet should be modified or not.

Content identifier 850 may comprise or be coupled to one or more of the transport processor 610, application processor 620 and container processor 630 of the slow-path module of FIG. 6. Generally, content identifier 850 may parse, process and analyze the packet payload at the application layer and/or container layer.

Figure 8B:
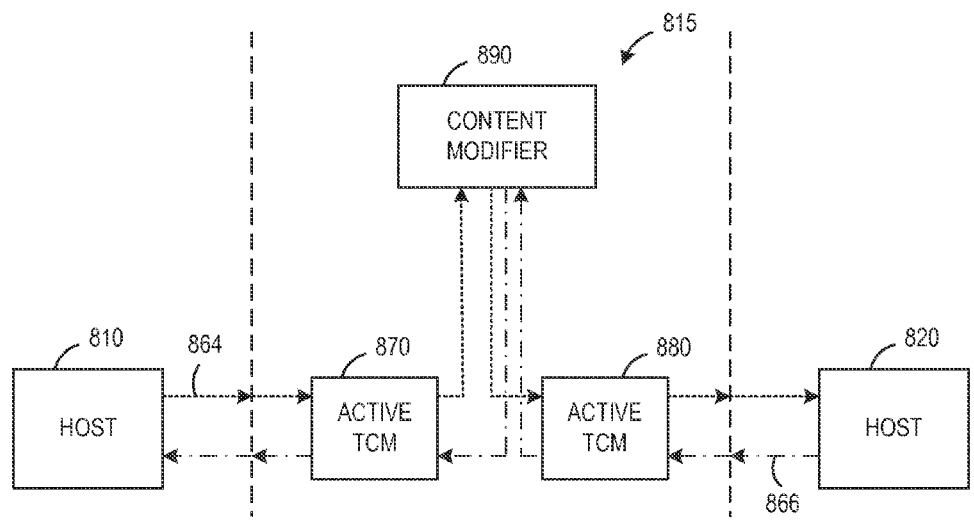
FIG. 8B is a communication flow diagram in an active mode in accordance with an example implementation.

Reference is next made to FIG. 8B, illustrating a communication flow diagram 800 for a slow-path module, such as the slow-path module 520, for a TCP flow in an active mode. In an active state, the TCP connection between the hosts is split such that two independent TCP connections are created on both sides of the network device to each host.

In the active mode, system 800 comprises an active transmission control module (active TCM) 870 corresponding to the first host 810, an active TCM 880 corresponding to the second host 820 and a content modifier 890. Each active TCM may be a software or hardware module. In the case of a software-based active TCM, each such active TCM may be a separate process executed by a processor of the network device 815, which is spawned when a new flow is to be analyzed, or when entering into the active identify state 730 or active modify state 740, as described with reference to FIG. 7.

In the active mode, a direct TCP connection between the first host 810 and the second host 820 is replaced with a connection from the first host 810 to the network device 815 and from the network device 815 to the second host 820.

A request packet from host 810 follows a path 864 as illustrated in FIG. 8B using a broken line. Accordingly, the request packet is forwarded successively to active TCM 870, content modifier 890, active TCM 880, and may be modified by any of these, before forwarding to host 820.

Conversely, a response packet from host 820 follows a path 866 as illustrated in FIG. 8B using a stippled line. The response packet is forwarded successively to active TCM 880, content modifier 890, active TCM 870, and may be modified by any of these (particularly content modifier 890), before forwarding to host 810.

Each side of the connection between the network device 815 and the first and the second hosts is maintained as a distinct, intermediate socket by active transmission control modules 870 and 880.

Active transmission control modules 870 and 880 may be software modules that receive the state estimate provided by the passive TCMs 830 and 840 to manipulate the existing TCP connection midstream.

Generally, the active transmission control modules and content modifier 890 execute some or all functions associated with the active identify state 730 and active modify state 740, as described with reference to FIG. 7.

Active TCM 880 corresponding to the first host 810 receives the state estimate for the first host from passive TCM 830. Active TCM 870 corresponding to the second host 820 receives the state estimate for the second host from passive TCM 840. Since each passive TCM maintains accurate TCP connection state information while in the passive state, the corresponding active TCM similarly has accurate TCP connection state information and can, at any time, transition into acting as a replacement or substitute for the remote host. This allows slow-path module 520 to passively identify traffic for some time using the passive TCMs, and subsequently use the stored connection state information to split the TCP connection in two using the active TCMs, without disrupting the original connection at either host. Thereafter, slow-path module 520 can intercept data sent between the hosts and simulate the original TCP connection by modifying packets as needed.

In the active mode, the current TCP flow may be dropped, left unchanged or modified. In cases where the TCP flow is placed into an active modify state 740 because of the determination that the incoming packets contain the predetermined content type (or in response to a control signal), active TCMs 870 and 880 may route the network data to the content modifier 890, which modifies the network data to generate modified network data.

Content modifier 890 may implement access control (e.g., determine whether to allow the media session to continue), re-multiplexing, request-response modification, client-aware buffer shaping, transcoding, and adaptive streaming control, in addition to the more conventional per-flow action such as marking, policing/shaping etc., as described herein, to generate the modified network data.

In cases where an active state is triggered not because of the determination that the incoming packets contain the predetermined content type, but because of other reasons, such as a deadlocked TCP connection, the active TCMs 870 and 880 may further process the incoming packets and determine whether to modify the packets to generate modified network data.

In some cases, active TCMs 870 and 880 may, upon further packet analysis, determine not to modify the flow data. In such cases, the network data can nevertheless be routed to the content modifier 890, which can leave the flow data unchanged.

The content modifier 890 may modify the payload data by, for example, transcoding when the slow-path module is in the active modify state 740. Content modifier 890 may alternatively leave the packer unmodified if the slow-path module is in an active forward state 750.

Figure 9A:
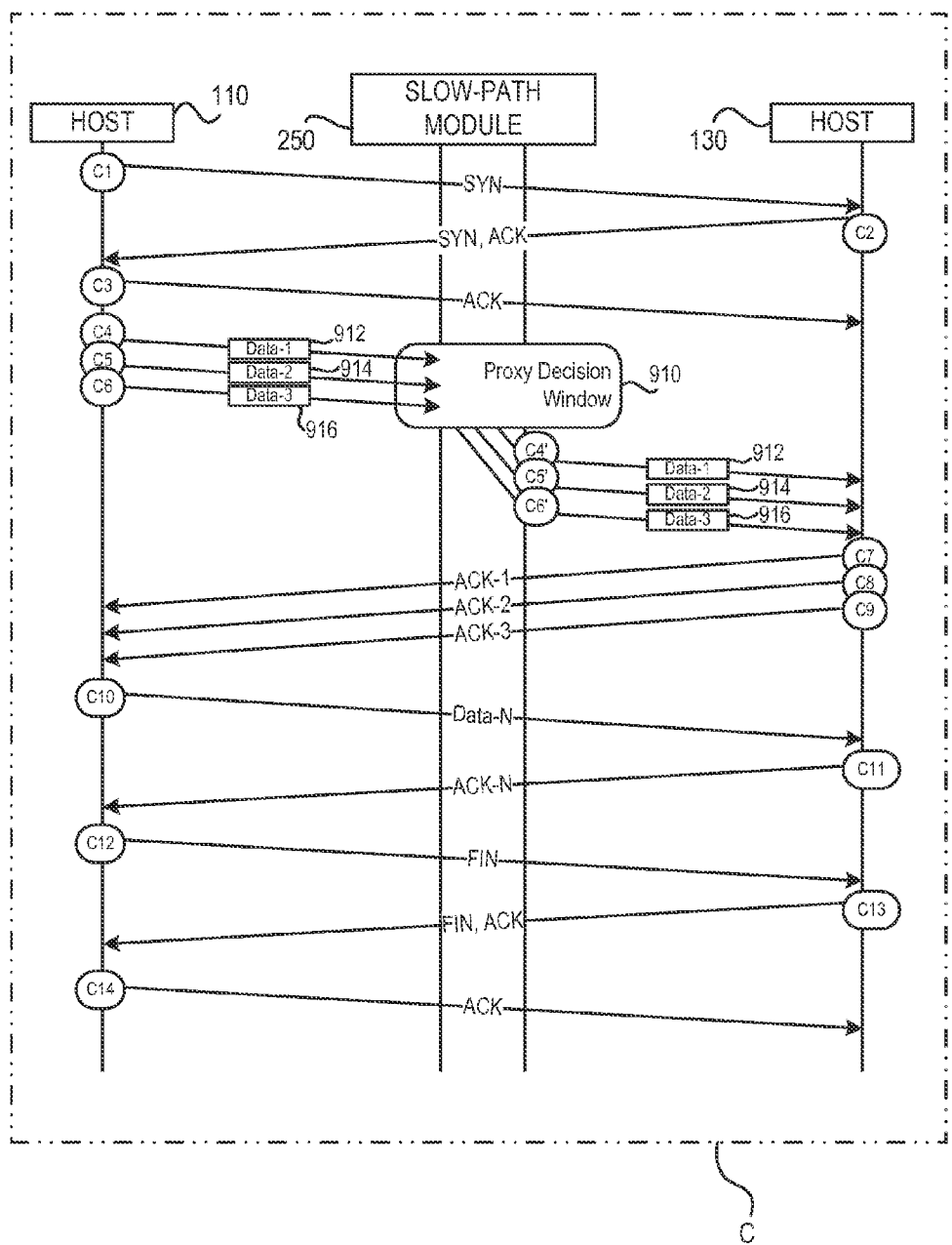
FIG. 9A is an example passive state data flow diagram for a slow-path module in accordance with an example implementation.

Referring now to FIG. 9A, there is illustrated a data flow diagram for an example slow-path module, such as slow path module 520, where the TCP flow remains in a passive state throughout the life of the TCP connection.

Connection establishment for connection C begins at C1 as host device 110 transmits a connection establishment request (SYN packet). The SYN packet is intercepted by slow-path module 520 and forwarded to host device 130.

Host device 130 receives the SYN packet and transmits a SYN ACK acknowledgment packet to host device 110 at C2. The SYN ACK packet is intercepted by slow-path module 520 and forwarded to host device 110, establishing the connection C between host device 110 and host device 130.

Accordingly, during connection establishment, the slow-path module 520 largely stays out the way, allowing the two remote host devices to communicate directly with each other to establish a connection. Instead of intercepting the original SYN and opening a separate TCP connection (like a conventional TCP proxy would), the slow-path module 520 simply analyzes the connection as it is established, keeping track of TCP connection state (e.g. the initial sequence numbers used by both hosts, the TCP options negotiated, etc.) in order to support a possible transition to active mode at a later time. Once the remote host devices have exchanged SYNs and ACKs, the connection is established. In many real-world scenarios, some connections may never become fully established or may be torn down without ever exchanging data. In these cases, slow-path module 520 can simply discard the initial state of the TCP flow once the connection is torn down and avoid most of the processing usually associated with establishment and teardown.

Once connection C is established, data can be transferred between the host devices 110 and 130.

At C4, C5 and C6, host device 110 transmits data packets 912, 914 and 916, respectively, which are intercepted by slow-path module 520. Data packets 912, 914 and 916 from host device 110 are received by a passive TCM (e.g., passive TCM 830) and added to a local queue where they are held temporarily while the data encapsulated by the packets is processed by the content identifier (e.g., content identifier 850). Once the data has been analyzed, the slow-path module 520 decides whether to:

Forward the packet(s) unchanged, keeping the bytestream unchanged;

Place the TCP flow in an active state and modify the bytestream as desired; or

Continue buffering the packet(s) locally and wait for additional data packets before making a determination.

Since the TCP flow is still in a passive state, no additional packets (or acknowledgments) are generated. Since the data packets are held by slow-path module 520, this also prevents host device 130 from generating acknowledgements. The net effect of this is bursts of increased latency while the application identifies traffic; if no managed carefully, these bursts can negatively impact network throughput by skewing the sending host's latency estimates, causing unnecessary retransmissions, etc. To avoid this, the slow-path module 520 can enforce strict limits on the amount of time and/or data that can be held for identification.

The length of time that the packets are held constitutes a decision window 910, which has the effect of introducing some initial latency at the recipient host device. For a typical sender, the held packets will be sent in less than a few milliseconds, which means the burst of latency is unnoticeable by the hosts. If the decision window 910 is allowed to exceed a predetermined identification period, this may significantly skew the sending host device's latency estimates, cause unnecessary retransmissions, and the like. To avoid this, slow-path module 520 may limit the length of the decision window 910 to less than the predetermined identification period, failing which it may place the TCP flow into an active identify state (not shown in FIG. 9A).

Although the example of FIG. 9A illustrates only one decision window 910, there may be a plurality of decision windows 910 while the TCP flow is in a passive state. For example, slow-path module 520 may hold one more packets for a period generally less than or equal to the decision window, forward the held packets, and then hold one or more additional packers in a further decision window.

If slow-path module 520 determines that the TCP flow should remain in the passive identify state 710, or should be placed into the passive forward state 720, data packets 912, 914 and 916 are forwarded to host device 130 in unmodified form at C4', C5' and C6', respectively. Host device 130 responds to receipt of the data packets by transmitting ACK packets at C7, C8 and C9.

Subsequently, host device 110 can transmit further data, for example at C10, and finally teardown the connection beginning at C12.

Accordingly, when a TCP flow remains in a passive state, slow-path module 520 observes connection establishment, identifies and forwards traffic during data transfer, and watches connection teardown. While the TCP flow is in the passive state, slow-path module 520 does not modify any payload data, inject packets, or issue any local acknowledgements. Since connection C has not been split, the remote hosts handle communication as if slow-path module 520 were not even present. The only noticeable difference this and a completely unmodified TCP conversation is the burst of latency associated with the proxy decision window 910.

Figure 9B:
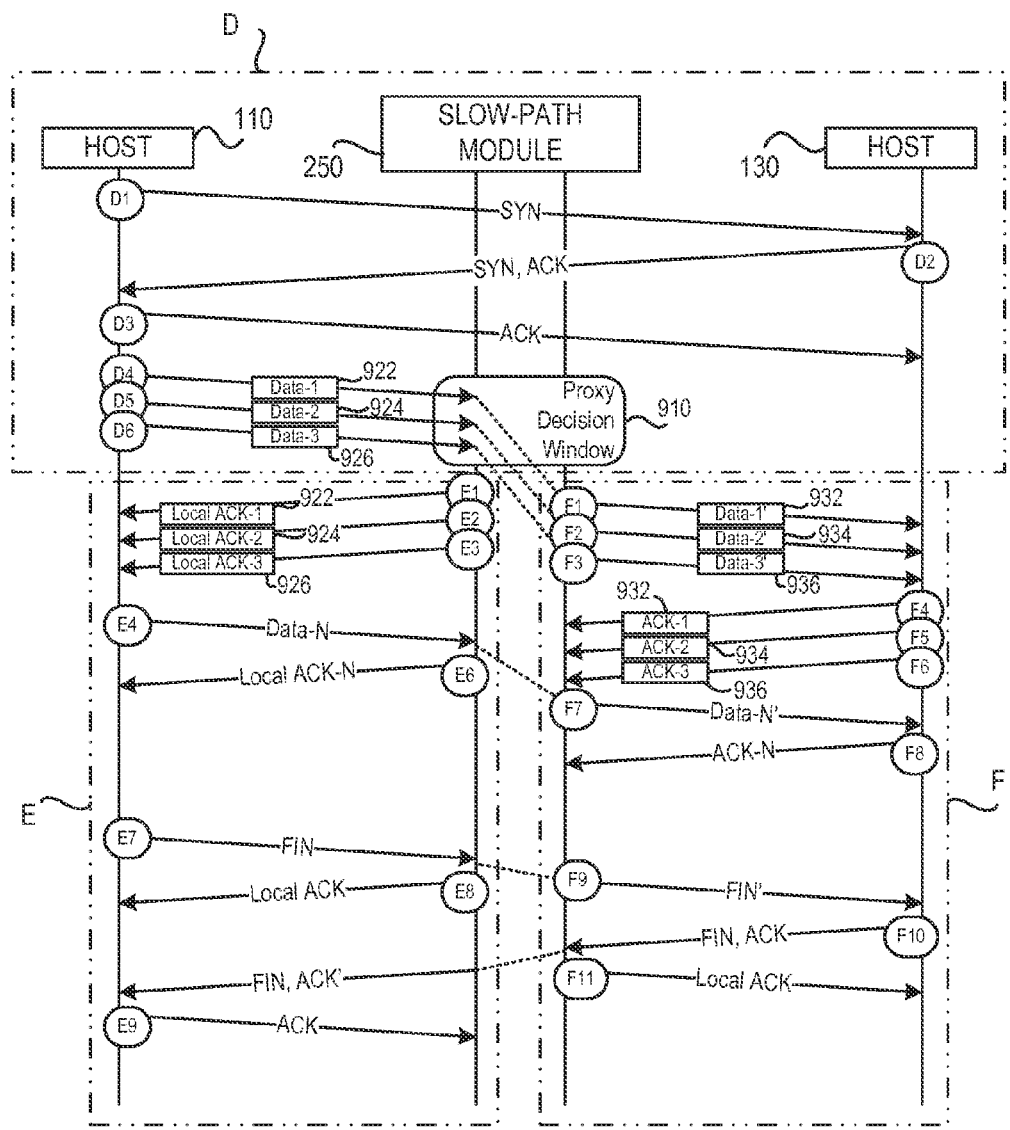
FIG. 9B is an example active state data flow diagram for a slow-path module in accordance with an example implementation.

Referring now to FIG. 9B, there is illustrated a data flow diagram for an example slow-path module, such as slow path module 520, where the TCP flow is placed into an active state during the TCP connection.

Connection establishment for connection D begins at D1 as host device 110 transmits a connection establishment request (SYN packet). The SYN packet is intercepted by slow-path module 520 and forwarded to host device 130.

Host device 130 receives the SYN packet and transmits a SYN ACK acknowledgment packet to host device 110 at D2. The SYN ACK packet is intercepted by slow-path module 520 and forwarded to host device 110, establishing the connection D between host device 110 and host device 130.

At D4, D5 and D6, host device transmits data packets 922, 924 and 926, respectively, which are intercepted by slow-path module 520. Data packets 922, 924 and 926 from host device 110 are received by a passive TCM (e.g., passive TCM 830) and added to a local queue where they are held temporarily while the data encapsulated by the packets is processed by the content identifier (e.g., content identifier 850).

In the example of FIG. 9B, the content identifier determines that the TCP flow should be placed in an active state (e.g., active modify state 740).

Accordingly, slow-path module 520 creates two new connections E and F, each initially sharing the current TCP connection state of connection D. Connection E continues between host device 110 and slow-path module 520, with an active TCM simulating host device 130. Similarly, connection F continues between slow-path module 520 and host device 130, with an active TCM simulating host device 110.

Accordingly, at F1, F2 and F3, slow-path module 520 transmits modified data packets 932, 934 and 936. Packets 932 to 936 may have been modified, for example, to transcode video data contained therein. Host device 130 receives the modified packets and transmits ACK packets at F4, F5 and F6, respectively. The ACK packets are received by slaw-path module 520 and not forwarded to host device 110.

Independently, in connection E, slow-path module 520 generates and transmits ACK packets 942, 944 and 946 to host device 110, acknowledging receipt of packets 922, 924 and 926. The data transfer continues in this manner until host device 110 transmits a FIN packet intercepted by slow-path module 520 at E6. A corresponding FIN packet is generated and transmitted from slow-path module 520 to host device 130 at F9. Teardown of both connections E and F continues as shown in FIG. 9B.

In both the examples of FIGS. 9A and 9B, slow-path module 520 initially allows a first connection to be established between host device 110 and host device 130 for a TCP flow. This first connection is directly between the host devices. In contrast to conventional TCP proxies, slow-path module 520 does not initially break the TCP flow into two separate TCP connections, with the slow-path module 520 as intermediary. Following an initial analysis, slow-path module 520 can then determine whether to allow the first connection to continue without intervention by slow-path module 520, or whether to place the TCP flow into separate TCP connections, which it can do without disrupting the TCP connection at either host device.

The present invention has been described here by way of example only. Various modification and variations may be made to these exemplary embodiments without departing from the scope of the invention. The scope of the claims should not be limited by the described embodiments and examples, but should be given the broadest interpretation consistent with the description as a whole.

We claim:

1. A method of optimizing data transmission for a current data flow from a first host to a second host via a network device, the network device comprising a processor and a memory, the method comprising:

the network device allowing establishment of a first TCP connection between the first host and the second host via the network device for the current data flow, wherein establishment of the first TCP connection comprises the processor spawning a first passive transmission control module process corresponding to the first host, and a second passive transmission control module process corresponding to the second host, wherein the first passive transmission control module process maintains first connection state information for the first host, and wherein the second passive transmission control module process maintains second connection state information for the second host, and wherein each of the first and second connection state information comprises TCP sequence numbering;

the processor executing the first and second passive transmission control module processes to maintain a model of connection state based on data sent or received in the first TCP connection, wherein the model of the connection state is initially in a passive identify state;

the processor executing the first passive transmission control module to send data from the first host to both a content identifier and the second host;

the processor executing the second passive transmission control module to send data from the second host to both the content identifier and the first host;

based on the data sent or received in the first TCP connection, the processor executing the content identifier to determine that an active connection state is to be used for the current data flow, and updating the model of connection state to the active connection state;

in response to determining that the active connection state is to be used, the processor spawning a first active transmission control module process corresponding to the first host, and a second active transmission control module process corresponding to the second host;

the processor executing the first active transmission control module process to receive the first connection state information from the first passive transmission control module process, and executing the second active transmission control module process to receive the second connection state information from the second passive transmission control module process;

the processor splitting the first TCP connection into a second TCP connection between the first host and the network device and a third TCP connection between the second host and the network device;

the processor executing the second active transmission control module process to emulate the first host in the third TCP connection using the second connection state information;

the processor executing the first active transmission control module process to emulate the second host in the second TCP connection using the first connection state information;

the processor executing the first active transmission control module process to receive data from the first host and to send the data from the first host to a content modifier;

the processor executing the second active transmission control module process to receive data from the second host and to send the data from the second host to the content modifier;

the processor executing the content modifier to process the data from the first host and to send the processed data from the first host to the second active transmission control module process;

the processor executing the content modifier to process the data from the second host and to send the processed data from the second host to the first active transmission control module process; and the processor executing the first active transmission control module process to send the processed data from the second host to the first host, and executing the second active transmission control module process to send the processed data from the first host to the second host.

2. The method of claim 1, further comprising, when the active connection state is not to be used, remaining in the passive identify state for the current data flow, wherein in the passive identify state the current data flow continues using the first TCP connection.

3. The method of claim 1, wherein determining that the active connection state is to be used for the current data flow comprises:

the processor executing the first passive transmission control module to hold delivery of the data from the first host to the second host during a decision window; and the processor executing the second passive transmission control module to hold delivery of the data from the second host to the first host during the decision window.

4. The method of claim 3, further comprising:

timing the decision window; and entering the active connection state for the current data flow when a length of the determining exceeds a predetermined identification period.

5. The method of claim 1, wherein the determining is based on a control signal that indicates the active connection state is to be used.

6. The method of claim 1, further comprising analyzing at least one data packet in the current data flow, and wherein the determining is based on the analysis of the at least one data packet.

7. The method of claim 6, wherein the at least one data packet comprises a plurality of packets, and wherein the analyzing comprises assembling the plurality of packets to provide payload data for the analyzing.

8. The method of claim 1, wherein, when in the active connection state, the method further comprises determining that the current flow data is to be modified.

9. The method of claim 8, wherein the current flow data comprises video data, and wherein the modifying comprises transcoding the video data.

10. A network device for optimizing data transmission for a current data flow from a first host to a second host, the network device comprising:
   a memory;
   at least one communication interface;
   a processor, the processor configured to:
      allow establishment of a first TCP connection between the first host and the second host via the network device for the current data flow, wherein establishment of the first TCP connection comprises the processor spawning a first passive transmission control module process corresponding to the first host, and a second passive transmission control module process corresponding to the second host, wherein the first passive transmission control module process maintains first connection state information for the first host, and wherein the second passive transmission control module process maintains second connection state information for the second host, and wherein each of the first and second connection state information comprises TCP sequence numbering;
      execute the first and second passive transmission control module processes to maintain a model of connection state based on data sent or received in the first TCP connection, wherein the model of the connection state is initially in a passive identify state;
      execute the first passive transmission control module to send data from the first host to both a content identifier and the second host;
      execute the second passive transmission control module to send data from the second host to both the content identifier and the first host;
      based on the data sent or received in the first TCP connection, execute the content identifier to determine that an active connection state is to be used for the current data flow, and update the model of connection state to the active connection state;
      in response to determining that the active connection state is to be used, spawn a first active transmission control module process corresponding to the first host, and a second active transmission control module process corresponding to the second host;
      execute the first active transmission control module process to receive the first connection state information from the first passive transmission control module process, and execute the second active transmission control module process to receive the second connection state information from the second passive transmission control module process;
      split the first TCP connection into a second TCP connection between the first host and the network device and a third TCP connection between the second host and the network device;
      execute the second active transmission control module process to emulate the first host in the third TCP connection using the second connection state information;
      execute the first active transmission control module process to emulate the second host in the second TCP connection using the first connection state information
      execute the first active transmission control module process to receive data from the first host and to send the data from the first host to a content modifier;
      execute the second active transmission control module process to receive data from the second host and to send the data from the second host to the content modifier;
      execute the content modifier to process the data from the first host and to send the processed data from the first host to the second active transmission control module process;
      execute the content modifier to process the data from the second host and to send the processed data from the second host to the first active transmission control module process; and
      execute the first active transmission control module process to send the processed data from the second host to the first host, and execute the second active transmission control module process to send the processed data from the first host to the second host.

11. The network device of claim 10, wherein the processor is further configured, when the active connection state is not to be used, to remain in the passive identify state for the current data flow, wherein in the passive identify state the current data flow continues using the first TCP connection.

12. The network device of claim 10, wherein
wherein determining that the active connection state is to be used for the current data flow comprises:
   the processor executing the first passive transmission control module to hold delivery of the data from the first host to the second host during a decision window; and
   the processor executing the second passive transmission control module to hold delivery of the data from the second host to the first host during the decision window.

13. The network device of claim 12, wherein the processor is further configured to:
   time the decision window; and
   enter the active connection state for the current data flow when a length of the determining exceeds a predetermined identification period.

14. The network device of claim 10, wherein the at least one processor determines whether to use the active connection state based on a control signal that indicates the active connection state is to be used.

15. The network device of claim 10, wherein the at least one additional processor is further configured to analyze at least one data packet in the current data flow, and determine whether to use the active connection state based on the analysis of the at least one data packet.

16. The network device of claim 15, wherein the at least one data packet comprises a plurality of packets, and wherein the at least one processor assembles the plurality of packets to provide payload data for the analyzing.

17. The network device of claim 10, wherein, when in the active connection state, the at least one processor determines that the current flow data is to be modified.

18. The network device of claim 17, wherein the current flow data comprises video data, and wherein the at least one processor is configured to transcode the video data.

* * * * *

UNITED STATES PATENT AND TRADEMARK OFFICE
CERTIFICATE OF CORRECTION

PATENT NO.        : 9,438,494 B2
APPLICATION NO.   : 13/724523
DATED             : September 6, 2016
INVENTOR(S)       : Charles N. Samuell et al.

It is certified that error appears in the above-identified patent and that said Letters Patent is hereby corrected as shown below:

In the Claims

At Column 30, Claim number 12, Line number 31, delete "wherein".

Signed and Sealed this
Tenth Day of January, 2017

Michelle K. Lee
*Director of the United States Patent and Trademark Office*